(12) United States Patent
Shioda et al.

(10) Patent No.: US 6,484,318 B1
(45) Date of Patent: Nov. 19, 2002

(54) CATV COMMUNICATION SYSTEM AND METHOD FOR THE INTERNET CONNECTION

(75) Inventors: Takehiko Shioda, Tokyo-to (JP); Akio Fukushima, Tokyo-to (JP); Ikuru Yoshida, Tokyo-to (JP); Jun Cheng, Tokyo-to (JP); Hidenobu Kato, Tokyo-to (JP); Masayuki Yamazaki, Tokyo-to (JP); Kazuya Abe, Tokyo-to (JP); Reiji Matsumoto, Tokyo-to (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 08/921,951

(22) Filed: Aug. 26, 1997

(30) Foreign Application Priority Data

Aug. 28, 1996 (JP) .............................................. 8-227213

(51) Int. Cl.[7] .............................................. H04N 7/173
(52) U.S. Cl. .......................... 725/110; 725/95; 725/98; 725/105; 725/118
(58) Field of Search ............................. 725/95, 96, 110, 725/111, 121, 126, 105, 118, 98

(56) References Cited

U.S. PATENT DOCUMENTS

| | | | |
|---|---|---|---|
| 5,818,825 A | * 10/1998 | Corrigan et al. | 370/329 |
| 5,966,636 A | * 10/1999 | Corrigan et al. | 455/4.2 |
| 5,999,970 A | * 12/1999 | Krisbergh et al. | 709/217 |
| 6,154,632 A | * 11/2000 | Hata et al. | |

FOREIGN PATENT DOCUMENTS

EP 0827339 A2 * 4/1998

* cited by examiner

Primary Examiner—Andrew Faile
Assistant Examiner—Ngoc Vu
(74) Attorney, Agent, or Firm—Ladas & Parry

(57) ABSTRACT

A CATV communication system includes a center and a plurality of terminal devices connected via a CATV net. The center includes: a first transmitter for transmitting upstream channel use information representing unoccupied channel; a first detector for detecting channel get request from data transmitted from the terminal device; a second detector for detecting a presence of the unoccupied channel; a second transmitter for assigning one of the detected unoccupied channels to the terminal device transmitted the channel get request and for transmitting channel assign data including a designation of the assigned channel; and a first communication unit for performing data communication with the terminal device via the assigned channel. The terminal device includes: a second communication unit connected to a computer for performing communication with the computer; a third detector for detecting center-directed data included in the data received from the computer; a fourth detector for detecting the upstream channel use information from the data transmitted; a third transmitter for selecting one of the unoccupied channels on the basis of the upstream channel use information and for transmitting the channel get request designating the selected channel to the center; a fifth detector for detecting the channel assign information; and a third communication unit for performing data communication with the center by using the upstream channel designated by the channel assign information for data transmission.

35 Claims, 15 Drawing Sheets

FIG. 3A
CAP

| FLAG | RECEIVER ADRS. | SENDER ADRS. | PROTO-COL NO. | DATA LENGTH | CONTENTS DATA | PADDING | CHK. BIT | FLAG |
|---|---|---|---|---|---|---|---|---|
| 180 | 182 | 184 | 186 | 188 | 190 | 192 | 194 | 180 |

FIG. 3B
EF

| PREAM-BLE | RECEIVER ADRS. | SENDER ADRS. | PROTOCOL NO. | CONTENTS DATA | ECC. | PREAM-BLE |
|---|---|---|---|---|---|---|
| 200 | 202 | 204 | 206 | 208 | 210 | 200 |

FIG. 4

| PROTOCOL NO. | UP/DOWN | CONTENTS DATA |
|---|---|---|
| 0011 | UP·DOWN | IP DATA FRAME |
| 0012 | DOWN | CHANNEL USE INF. |
| 0013 | UP | CONNECTION INF. |
| 0014 | DOWN | PHYSICAL CHANNEL INF. |
| 0015 | UP | CHANNEL GET REQUEST |
| 0016 | UP | CHANNEL OPEN REQUEST |
| 0017 | DOWN | CHANNEL ASSIGN INF. |
| 0018 | DOWN | CHANNEL OPEN CONFIRM INF. |

PROTOCOL CONT. INF. (covers rows 0012–0018)

| TERM ADRS | IP ADRS | CANCEL RESV. FLAG |
|---|---|---|
| 1 | IPa | |
| 2 | IPb, IPc, IPd | R |
| ⋮ | | |
| 500 | IPx, IPy | |

| UP CH No. | USE CONDITION | TERM ADRS | UPSTREAM CONT No. |
|---|---|---|---|
| 1 | Y | ②  | A |
| 2 | N | 3 | A |
| 3 | N | 1 | A |
| ⋮ | ⋮ | ⋮ | ⋮ |
| 30 | Y | 1 | A |
| 31 | Y | 1 | B |
| ⋮ | ⋮ | ⋮ | ⋮ |
| 60 | N | 2 | B |

| DOWN CONT No. | MAC ADRS | ASSIGNED TERM ADRS |
|---|---|---|
| 1ch | MA1 | 1, ②  |
| 2ch | MA2 | 3, 4 |
| 3ch | MA3 | 10, 11 |

| DOWN CONT No. | MAC ADRS | IP ADRS |
|---|---|---|
| 1ch | MA1 | IPa, IPb, IPc, IPd |
| 2ch | MA2 | IPe, IPf |
| 3ch | MA3 | IPg, IPh |

CATV COMMUNICATION SYSTEM AND METHOD FOR THE INTERNET CONNECTION

BACKGROUND OF THE INVENTION

1. Field of the Invention

The present invention relates to a CATV system and a communication method therefor, and more particularly to a technique to connect to the internet from a terminal via a CATV net.

2. Description of the Prior Art

When a user in a household connects to the, internet by a computer such as a personal computer, generally he or she individually makes a contract with a provider of the internet connection service and connects to the internet via the public telephone line with the aid of the provider's service. Contrary to this, there has recently been examined a method of connecting the internet via an existing CATV net.

However, the existing CATV net is originally designed to supply video and/or audio data from the center to the subscribers, and its upstream transmission band is extremely narrower than the downstream transmission band. Concretely, in a general CATV system, the upstream transmission lines are assigned to the frequency band of 5–50 MHz, and the downstream transmission lines are assigned to the frequency band of 50–450 MHz. The downstream transmission band is relatively broad in order to transmit multichannel television signal to the terminals of the subscribers as the original role of the CATV system. In contrast, the upstream transmission lines are used only for the transmission of control data such as accounting data to the subscribers, and hence its bandwidth is originally very narrow. Therefore, it is difficult to use the existing CATV net for the internet connection, i.e., bidirectional communication.

SUMMARY OF THE INVENTION

It is an object of the present invention to provide a CATV communication system and a communication method which enable the internet connection via the existing CATV net.

According to one aspect of the present invention, there is provided a CATV communication system including a center and a plurality of terminal devices connected via a CATV net, the center including: a first transmitter for transmitting, to the terminal device, upstream channel use information representing unoccupied channel out of a plurality of upstream channels; a first detector for detecting channel get request from data transmitted from the terminal device; a second detector for detecting a presence of the unoccupied channel in the upstream channels when the channel get request is detected; a second transmitter for assigning one of the detected unoccupied channels to the terminal device which has transmitted the channel get request and for transmitting channel assign data including a designation of the assigned channel to the terminal device when the unoccupied channel is detected; and a first communication unit for performing data communication with the terminal device via the assigned channel, and the terminal device including: a second communication unit connected to a computer for performing communication with the computer; a third detector for detecting center-directed data, to be transmitted to the center, which is included in the data received from the computer; a fourth detector for detecting the upstream channel use information from the data transmitted from the center when the center-directed data is detected; a third transmitter for selecting one of the unoccupied channels on the basis of the upstream channel use information and for transmitting the channel get request designating the selected channel to the center; a fifth detector for detecting the channel assign information from the data transmitted from the center; and a third communication unit for performing data communication with the center by using the upstream channel designated by the channel assign information for data transmission after the channel assign information is detected.

According to another aspect of the present invention, there is provided a center connected to a plurality of terminal devices via a CATV net, including: a first transmitter for transmitting, to the terminal device, upstream channel use information representing unoccupied channel out of a plurality of upstream channels; a first detector for detecting channel get request, including a designation of a channel to be used, from data transmitted from the terminal device; a second detector for detecting a presence of the unoccupied channel in the upstream channels when the channel get request is detected; a second transmitter for assigning one of the detected unoccupied channels to the terminal device which has transmitted the channel get request and for transmitting channel assign data including a designation of the assigned channel to the terminal device when the unoccupied channel is detected; and a first communication unit for performing data communication with the terminal device by using the assigned channel for data transmission.

According to still another aspect of the present invention, there is provided a terminal device connected to a center via a CATV net, including: a first communication unit connected to a computer for performing communication with the computer; a first detector for detecting center-directed data, to be transmitted to the center, which is included in the data received from the computer; a second detector for detecting upstream channel use information representing an unoccupied channel out of a plurality of upstream channels from the data transmitted from the center when the center-directed data is detected; a first transmitter for selecting one of the unoccupied channels on the basis of the upstream channel use information and for transmitting the channel get request designating the selected channel to the center; a third detector for detecting channel assign information from the data transmitted from the center, the channel assign information being transmitted by the center in response to the channel get request and assigning an unoccupied channels; and a second communication unit for performing data communication with the center by using the upstream channel designated by the channel assign information for data transmission after the channel assign information is detected.

In accordance with the CATV system thus configured, the center transmits the upstream channel use information representing the unoccupied channel to the terminal device. When there is data to be transmitted to the center, the terminal device detects the upstream channel use information from data transmitted from the center, selects one of the unoccupied upstream channel, and transmits the channel get request to the center. On receiving the channel get request, the center checks the channel occupancy condition at that time to examine whether or not the channel designated by the channel get request is occupied. If it is unoccupied, the center determines to assign the channel to the terminal device which has transmitted the channel get request, and transmits the channel assign information to the sender terminal device. When receiving this channel assign information, the terminal device judges that the use of the channel is permitted, and performs data communication with the center by using the channel for data transmission. Therefore, by transmitting the channel use information and the channel get request between the center and the terminal device, the internet connection via the CATV communication system may be achieved with making the best use of the channels of limited number.

The center may be configured to receive the channel open request and to forcibly disconnect the channel designated by the channel open request. By this, vain channel use may be avoided and the usage efficiency of the communication line may be improved. In addition, if the system is configured such that the center sends the channel open confirmation information to the terminal device before actually disconnecting the channel, erroneous disconnection due to noise or the like may be avoided. Further, the center may be configured to forcibly disconnect the channel if the communication condition of the channel is not normal. By this, the communication can be appropriately terminated in the system failure or accident.

If the center is configured to have a control LAN for control operation and a center LAN, independent of the center LAN, for data communication, the control operation may be separated from the data communication, thereby reducing the possibility of system error or confusion. If the terminal device is configured to transmit the channel use information to the center and the center forcibly disconnect the non-used channel, the line usage efficiency may be improved The terminal device may configured to select the channel for the channel get request by using the random number. In addition, the terminal device may transmit the channel get request by a signal having the power determined by the random number and/or transmit the channel get request at the timings determined by the random number. With these modifications, the unevenness or deviation in the selection of the channel is avoided, and the possibility of collision of the channel get requests sent from plural terminal devices may be effectively avoided. The center and the terminal device may perform the data communication by using the cable packets which include control data and internet protocol. Therefore, both IP frame and control data can be transmitted by the cable packets, and the protocol can be simplified.

According to still another aspect of the present invention, there is provided a CATV communication method for performing a communication between a center and a plurality of terminal devices connected via a CATV net, the method including the steps of: transmitting, from the center to the terminal device, upstream channel use information representing unoccupied channel out of a plurality of upstream channels at every predetermined time period; detecting, in the terminal device, center-directed data, to be transmitted to the center, which is included in the data received from a computer to which the terminal device is connected; detecting, in the terminal device, the upstream channel use information from the data transmitted from the center when the center-directed data is detected; selecting, in the terminal device, one unoccupied channel on the basis of the upstream channel use information and transmitting the channel get request designating the selected channel to the center; detecting, in the center, channel get request from data transmitted from the terminal device; detecting, in the center, a presence of the unoccupied channel in the upstream channels when the channel get request is detected; assigning, in the center, one of the detected unoccupied channels to the terminal device which has transmitted the channel get request and transmitting channel assign data including a designation of the assigned channel from the center to the terminal device when the unoccupied channel is detected; detecting, in the terminal device, the channel assign information from the data transmitted from the center; and performing data communication between the center and the terminal device by using the upstream channel designated by the channel assign information for data transmission after the channel assign information is detected.

According to still another aspect of the present invention, there is provided a CATV communication method for performing a communication between a center and a plurality of terminal devices connected via a CATV net, the method including the steps of: transmitting upstream channel use information representing unoccupied channel out of upstream channels from the center to the plurality of terminal devices; detecting the upstream channel use information if there is data to be transmitted to the center, selecting one of the unoccupied channels and transmitting channel get request to the center if the upstream channel use information is detected; checking a condition of occupancy of the requested upstream channel when receiving the channel get request in the center, assigning the channel to the terminal device which has transmitted the channel get request if the requested channel is unoccupied, and transmitting channel assign data including a designation of the assigned channel to the terminal device; and transmitting the data to the center via the assigned upstream channel when the terminal device which has transmitted the channel get request detects the channel assign information.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 3A and 3B are diagrams showing data structure of a cable packet and an ethernet frame;

FIG. 4 is a diagram showing the correspondence between protocol numbers of the cable packet and contents data;

FIG. 7 is a diagram showing the contents of,the terminal-IP address table shown in FIG. 6;

FIGS. 8A and 8B are diagrams showing the contents of the channel use table shown in FIG. 6;

FIG. 10 is a diagram showing the contents of the table in the upstream controller shown in FIG. 9;

DETAILED DESCRIPTION OF THE PREFERRED EMBODIMENTS

Figure 1:
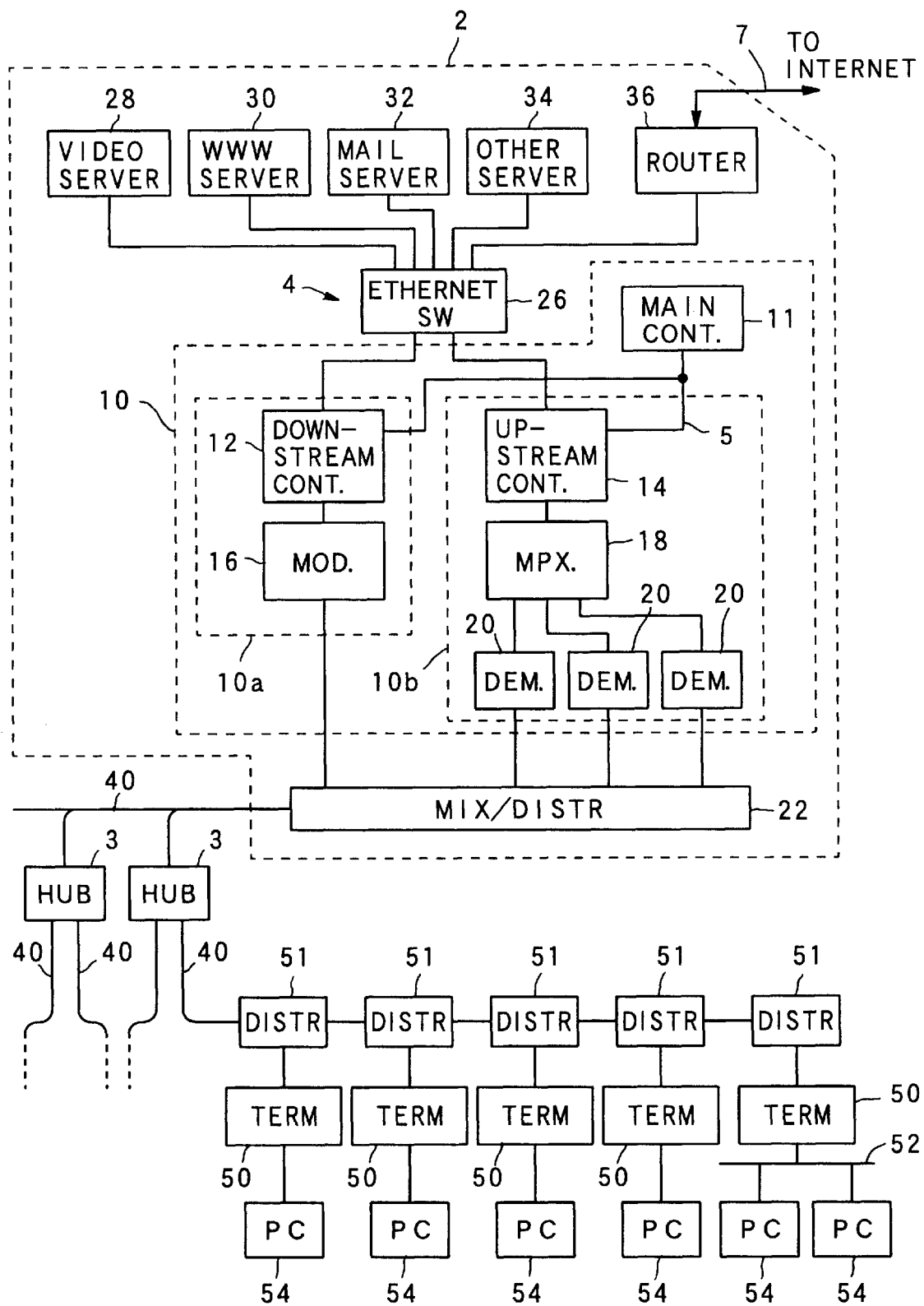
FIG. 1 is a block diagram showing a configuration of a CATV communication system according to an embodiment of the present invention.

The preferred embodiment of the present invention will now be described below with reference to the attached drawings. FIG. 1 roughly shows the configuration of a CATV communication system according to an embodiment of the present invention. The CATV system 1 shown in FIG. 1 is an optical fiber/coaxial cable hybrid urban type system, in which a center 2 and plural terminal devices 50 are connected to each other via a CATV net 40. On the terminal side, the CATV net 40 is connected to the terminal devices 50 installed in households via hubs 3, and one hub 30 is connected to the terminal devices of approximately 500 households. Here, the hybrid type system is employed in order to reduce noise in the signals transmitted to the center via the upstream lines.

Figure 2A:
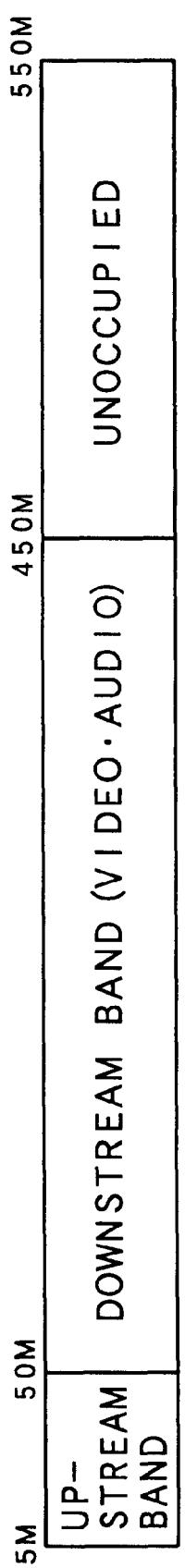
FIGS. 2A and 2B are diagrams showing a frequency band assignment in the CATV communication system.
Figure 2B:
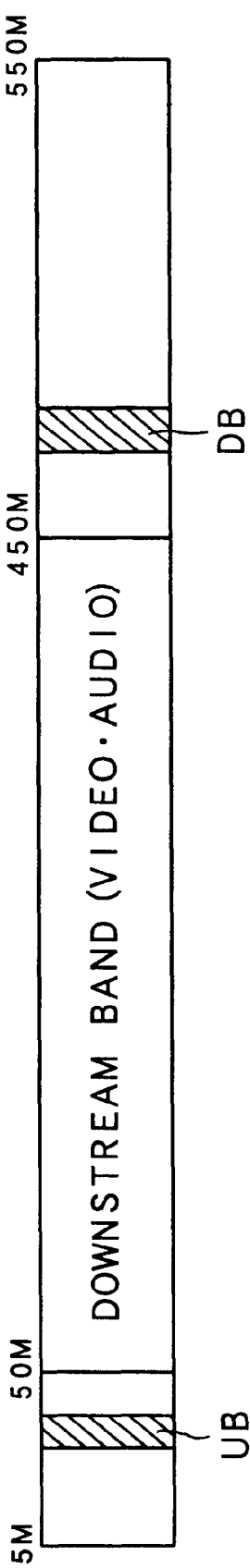

Next, the description will be given of the assignment of the upstream/downstream channels in this system. Now, assuming that there are 500 subscribers per one hub, that the percentage of the internet system subscribers according to this invention out of the overall subscribers is 60%, and that the percentage of the simultaneous use of the internet system is 10%, it is expected that about 30 terminals simultaneously access the internet. Accordingly, in the embodiment described below, it is determined to maintain 30 upstream channels for the internet use. As shown in FIG. 2A, in a general CATV system, the upstream signal band is assigned to the frequency band of 5–50 MHz, and the downstream, signal band is assigned to the frequency band higher than 50 MHz. The frequency band of 50–450 MHz is used for the transmission of television signals in the normal CATV service, and the frequency band higher than 450 MHz is generally unoccupied. As appreciated, the upstream signal band is originally narrow and information for accounting or the like should be transmitted therethrough, and hence it is determined to maintain the upstream internet band UB of about 6 MHz within the upstream band and to set independent 30 upstream channels, each having the transmission rate of 128 kbps, within the upstream internet band UB by QPSK. With respect to the downstream signal band, the downstream internet band DB of about 6 MHz is assigned within the band higher than 450 MHz, which is generally unoccupied, as the downstream channels. The downstream channel has a transmission rate of 30 Mbps with the use of QAM and data is transmitted in the form of packets. In the downstream channels, not only the packets addressed to the user of the 30 upstream channels but other packets are transmitted. However, assuming that only the packets addressed to the users of the upstream channels are transmitted: via the downstream channels, the ratio of the upstream and downstream transmission rates is about 1:10. This ratio is reasonable because, in a general internet use, relatively large data such as video data are frequently downloaded from the server via the downstream channel. If downstream data seems to further increase, additional channels may be provided.

Next, the configuration of the system will be described with reference to FIG. 1. The center 2 has a center LAN 4 including an ethernet with an ethernet switch 26 at the center, and various servers including a video server 28, WWW (World Wide Web) server 30 and a mail server 32 and a router 36 to enable the internet connection via a public line 7 are connected to the center LAN 4. Further, the center 2 has a center device 10 which includes a downstream communication unit 10a and an upstream communication unit 10b, each of which has a predetermined data transmission capacity, and a standardization can be achieved by using those units as a unit equipment. Therefore, if it becomes necessary to increase the data transmission capacity, those units may be extended. Since the control systems of those units are of LAN configuration, such an extension can be readily carried out. A downstream controller 12 in the downstream communication unit 10a and an upstream controller 14 in the upstream communication unit 10b are both connected to the center LAN 4. Since the center LAN 4 is connected to the internet via the router 36, personal computers 54 in the households can be connected to the internet by connecting to the center LAN 4 via the CATV net 40 and the center device 10.

The downstream controller 12 performs a control to transmit data obtained in the internet to the CATV net 40 via the center LAN 4, and a modulator 16 modulates the downstream data from the downstream controller 12 by QAM and transmits the thus modulated data to the CATV net 40 via the mixer/distributor 22. The CATV net 40 between the mixer/distributor 22 and the hub 3 is configured by optical fiber cables with optical modulator/demodulators therefor (not shown). On the other hand, data transmitted from the terminal device 50 via the CATV net 40 enters the center device 10 via the mixer/distributor 22, and is QPSK-demodulated by the demodulator 20 to be supplied to the multiplexer 18. The multiplexer 18 multiplexes the upstream data from the plural demodulators 20 time-divisionally and supplies the multiplexed data to the upstream controller 14, which in turn transmits the upstream data to the center LAN 4.

In the center device 10, the control LAN 5 is established independently of the center LAN 4, and the main controller 11 controls the downstream controller 12 and the upstream controller 14 by using the control LAN 5. The control LAN 5 for exclusive use is established so as to separate the control of the upstream and downstream controllers 12 and 14 from the mass data transmission between the center. LAN 4 and the CATV net 40 to achieve secure control of the controllers 12 and 14. In addition, the independent establishment of the control LAN 5 offers an advantage in security. Namely, even if important information is transmitted between controllers, an invader who enters via the CATV net 40 can not watch or access the important control information in the control LAN 5. Further, when the downstream and/or upstream communication units 10a and/or 10b are added according to need, the connection of lines and control of the units may be simplified.

The hubs 3 are connected to the terminal devices 50 of about 500 households. The downstream data transmitted from the CATV net 40 via the hub 3 is transmitted to the terminal devices 50 via the distributors 51. The terminal devices 50 perform data transmission between the personal computers 54 in the households and the CATV net 40. The terminal device 50 and plural personal computers 54 may constitute the terminal LAN 52 as shown in FIG. 1.

With the above configuration, the upstream data outputted from the personal computer 54 in the household is transmitted to the internet via the terminal device 50, the hub 3, the CATV net 40, the upstream controller 14 in the center device 10, the center LAN 4, the router 36 and the public line 7 in this order. On the other hand, the downstream data from the internet is transmitted to the personal computer 54 in the household via the router 36, the center LAN 4, the downstream controller 12 in the center device 10, the CATV net 40, the hub 3 and the terminal device 50 in this order. In this way, the connection to the internet may be achieved.

Next, data transmission method in this system will be described. In this system, as described above, the center LAN 4 is constituted in the center 2 by the upstream controller 14, the downstream controller 12, various servers and the router 36. In addition, the control LAN 5 is constituted by the main controller 11, the upstream controller 14 and the downstream controller 12. Further, on the terminal side, the LAN 52 is constituted by the terminal device 50 and the plural personal computers 54. Since all these LANs are established by ethernet, the data transmission is carried out by a method according to the ethernet. On the other hand, the data transmission between the center device 10 and the terminal device 50 is carried out by the packet multiplexing method. A packet used in the present invention will be hereinafter referred to as "cable packet CAP".

A data frame used in the ethernet is called "Ethernet Frame EF". FIG. 3B shows the concept of the ethernet frame EF. As illustrated, the ethernet frame EF includes the preamble 200, the receiver address 202, the sender address 204, the protocol number 206, the contents data 208 and the error correction code 210. Since the ethernet itself is a known network technique, further details of the ethernet frame will not be described.

On the other hand, the data transmission between the center device 10 and the terminal device 50 is carried out by the cable packets, as described above. The configuration of a frame of the cable packet is illustrated in FIG. 3A. As seen, the cable packet CAP includes the flag 180, the receiver address 182, the sender address 184, the protocol number 186, the data length 188, the contents data 190, the padding 192 and the check bit 194.

The flag 180 is a data for synchronization of the cable packets, and the data sandwiched by the successive two flags 180 constitutes a cable packet. The receiver address 182 is a data representing an address of the receiver to which the subject cable packet is transmitted. All terminal devices 50 connected to the CATV net 40 are assigned with terminal addresses, in advance, which identify the respective terminal devices 50, and in the downstream cable packet the terminal address of the terminal device 50 to which the cable packet is sent is described as the receiver address 182. Sometimes, the center 2 transmits an identical downstream cable packet to all terminal devices 50 (this is called concerted communications), and in this case a predetermined certain address (hereinafter referred to as "global address") designating all terminal devices 50 is written as the receiver address 182. In the upstream cable packet, an address designating the center 2 is written in the receiver address 182. The sender address 184 represents the address of the sender of the cable packet. The address of the center 2 is written as the sender address 184 in the downstream cable packet, and the terminal address of one of the terminal devices 50 is written as the sender address 184 in the upstream cable packet.

The protocol number 186 is information representing the kind of the subject cable packet, and specifically the protocol number 186 represents the contents of data included in the contents data 190. The contents data 190 is an internet protocol (IP) frame used for the communication with the internet, or information relating to the connection between the center 2 and the terminal device 50 (hereinafter referred to as "protocol control information"). FIG. 4 shows the detail of the contents data 190. The internet protocol (IP) data frame is a frame of data transmitted between the server on the internet and the user of the personal computer 54, and is used in both upstream and downstream transmissions.

The contents data other than the IP data frame are all protocol control information which mainly relate to the channel used for the data transmission. The channel use information is transmitted in the downstream, i.e., from the center device 10 to the terminal device 50, and represents unoccupied (currently no used) channels out of 30 upstream channels. The connection information represents whether or not the channels is currently used. The physical channel information is a downstream data transmitted from the center device 10 to the terminal device 50, and represents the number and frequencies of the upstream and downstream channels. The channel get request is upstream data for notifying the center device 10 of the channel which the terminal device 50 wants to use. The channel assign information is downstream data for notifying the terminal device, which issued the channel get request, of the channel which the center device 10 permits the terminal device 50 to use. The channel open request is upstream data. If a certain channel is not used for more than a given time period, the terminal device 50 transmits information relating to the non-used channel, as the channel open request, to the center device 10 so that the center device forcibly terminates the use of that non-used channel. The channel open confirm information is downstream data. When the center device. receives the channel open request and acknowledges it, it sends the channel open confirm information to notify the acknowledgment of the request from the terminal device 50. As described above, the contents data 190 includes IP data frame or protocol control information, and the identification information of the contents data is written in the cable packet as the protocol number 186.

The data length 188 represents the length of the contents data 190, and the padding 192 is meaningless data (dummy data) inserted for the purpose of making the length of the contents data 190 be a multiple of 4 bytes. The check bit 194 is an error correction code such as CRC (Cyclic Redundant Code) for the data within the cable packet. Since 64 QAM is performed for the downstream data transmission in this embodiment, the check bit may be omitted in the downstream cable packet, because 64 QAM itself has an error correction function and hence additional error correction by using the check bit is not necessary. Concretely, at the time of 64 QAM of the cable packet, an error correction code according to Reed-Solomon or the like is added to the packet, and the error correction is carried out at the time of demodulation.

Next, the configuration of the terminal device 50 installed in the household will be described in detail. FIG. S shows the configuration of the terminal device. The terminal device 50 performs the downstream data processing for transmitting the downstream data supplied from the CATV net 40 via the hubs 3 to the personal computers 54 via the terminal LAN 52, and the upstream data processing for transmitting the upstream data supplied from the personal computers 54 via the terminal LAN 52 to the CATV net 40.

First, the configuration relevant to the downstream data processing will be described. The QAM receiver 60 receives the QAM-modulated signal from the distributor 51, and demodulates it to output demodulated data. The error correction circuit 62 performs error correction according to the QAM modulation, and outputs data after the error correction. The frame detection circuit 64 detects the frames from the data after the error correction to detect cable packets. The address comparison circuit 66 refers to the receiver address 182 in the detected cable packet, and judges whether or not the receiver address 182 thus detected is one of the terminal address designating the subject terminal device 50 and the global address. The terminal address memory 76 stores its own terminal address and the global address, and the address comparison circuit 66 makes the comparison by referring to the terminal address memory 76.

The data identification circuit 68 refers to the protocol number 186 in the cable packet, and identifies the kind of the cable packet. Specifically, the data identification circuit 68 judges whether or not the protocol number 186 is the code (0011h, h:hexadecimal) indicating the IP data frame (see. FIG. 4). If the judgment result is affirmative, the data identification circuit 68 writes the contents data 190 of the subject cable packet into the first memory 70. If the judgment result is negative, i.e., in the case of protocol control information, the data identification circuit 68 writes it into the second memory 78. The IP-MAC table 80 is a table which represents the correspondence between the IP address included in the IP data frame and the MAC (Media Access Control) address assigned within the terminal LAN 52. MAC address is an address which identifies a personal computer connected to the ethernet (it is effective in the ethernet only, and is also called as ethernet address). The IP data frame transmitted from the internet includes the IP address designating its receiver. However, since the terminal device 50 constitutes the terminal LAN 52 together with the plural personal computers 54, it is necessary to obtain the MAC address corresponding to the IP address of the receiver so that the receiver of the IP data frame is identified. The IP-MAC table 80 stores this relationship. The frame production circuit 72 refers to the IP-MAC table 80 to obtain the MAC address corresponding to the IP address, and then produces an ethernet frame, which is directed to the obtained MAC address, from the IP data frame. The ethernet transmitter 74 transmits the ethernet frame thus produced to the terminal LAN 52.

Next, the configuration relevant to the upstream data processing will be described. The ethernet receiver 94 receives data transmitted from the terminal LAN 52. The frame detection circuit 96 detects the ethernet frame from the data thus received. The terminal address memory 92 stores the MAC address of itself (the terminal device 50 to which it belongs) within the terminal LAN 52 and the broadcast MAC address. The address comparison circuit 98 refers to the receiver address 202 of the detected ethernet frame, and compares it with its own MAC address or the broadcast MAC address. Only when the receiver address 202 coincides with one of them, the address comparison circuit 98 supplies the ethernet frame to the data identification circuit 100. The data identification circuit 100 refers to the protocol number 206 in the ethernet frame, and write the IP data frame into the fourth memory 102 if the protocol number designates the IP data frame. If the protocol number does not designate the IP data frame, the data identification circuit 100 writes the IP data frame into the third memory 90 because the ethernet frame is a frame including protocol control information (hereinafter referred to as "control frame").

The frame production circuit 104 produces a cable packet including the IP data frame stored in the fourth memory 1.02 as the contents data 190. At this time, the terminal address of its own is written into the sender address 184, and the address of the center 2 is written into the receiver address 182. The error correction encoder 106 adds the check bit 194 to the cable packet thus produced. The QPSK transmitter 108 modulates the cable packet with the check bit by QPSK, and transmits the resultant signal to the CATV net 40 via the distributor 51.

The controller 88 carries out total control of the components in the terminal device 50. The data detection circuit 82 detects the presence or absence of data output from the frame production circuit 72 and the data identification circuit 100, and notifies the result to the controller 88. The channel table 84 is a memory for storing information relating to the usable (unoccupied) upstream and downstream channels, and specifically the preset frequencies of the plural channels are stored therein. The ARP (Address Resolution Protocol) table 86 is a memory for storing the correspondence between the IP address and the MAC address within the terminal LAN 52.

Next, the description will be given. of the configuration of the main controller 11, the downstream controller 12 and the upstream controller 14 in the center device 10.

Figure 6:
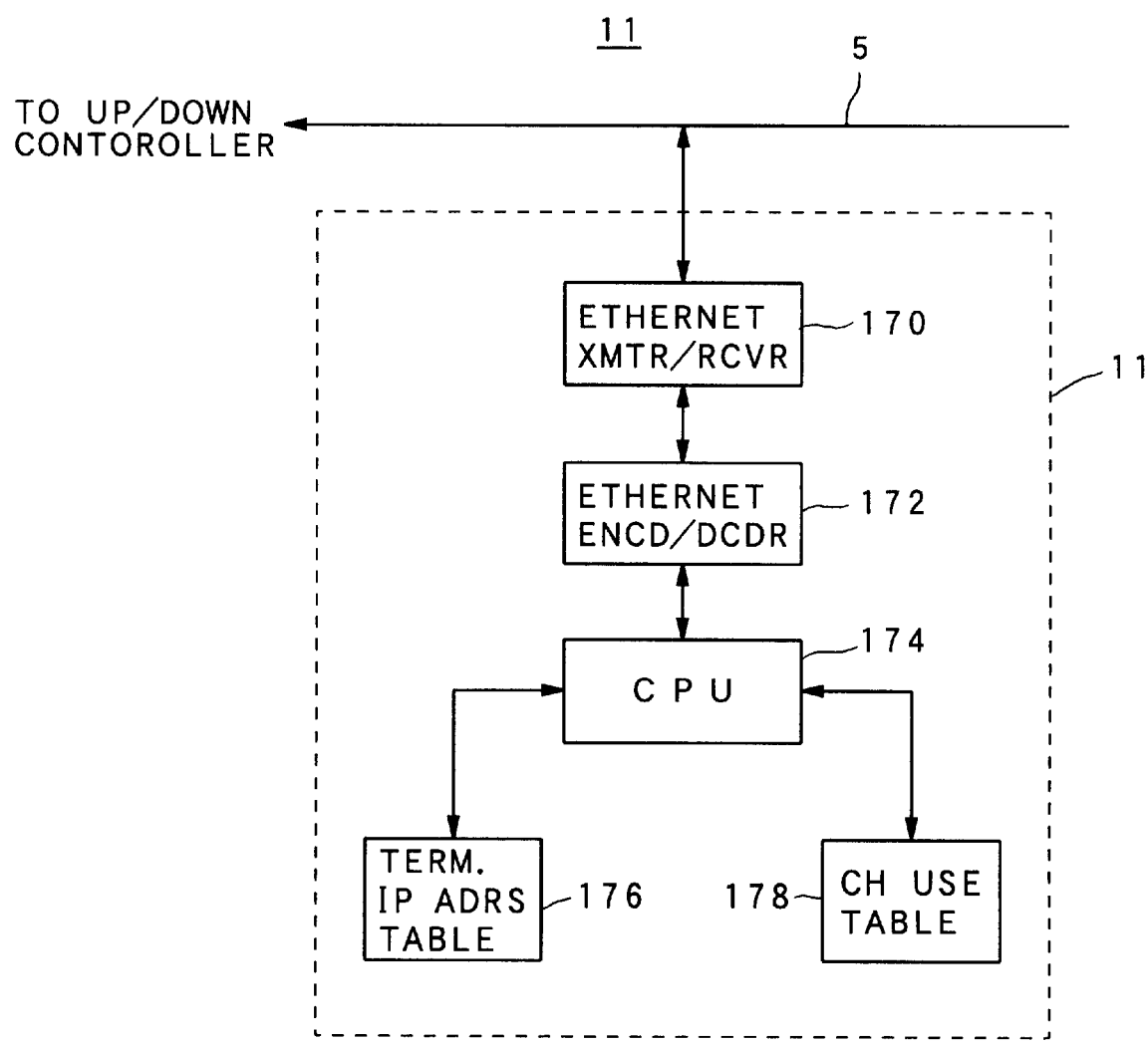
FIG. 6 is a block diagram showing the configuration of the main controller shown in FIG. 1.

First, the configuration of the main controller 11 will be described. FIG. 6 shows the configuration of the main controller 11, in which the ethernet transmitter/receiver 170 receives the ethernet frame from the control LAN 5, and transmits the ethernet frame produced by the ethernet encoder/decoder 172 to the control LAN 5. The ethernet encoder/decoder 172 encodes the ethernet frame received by the ethernet transmitter/receiver 170 to read out the contents, and produces: the ethernet frame to be transmitted under the control of the CPU 174. The terminal-IP address table 176 is a memory for storing, as shown in FIG. 7, the correspondence between the terminal addresses of the terminal devices 50 connected to the CATV net 40 and the IP addresses of the personal computers 54 connected to the terminal devices 50. If the terminal device 50 is connected to only one personal computer 54, only one IP address exists while if the terminal device 50 constitutes a LAN, there are multiple IP addresses. The channel use table 178 has the upstream channel table, shown in FIG. 8A and the downstream channel table shown in FIG. 8B. The upstream channel table stores, for each upstream channels, the current use condition, the terminal address of the terminal device which is currently in use and the number of the upstream controller performing management. It is noted that the upstream controller number is stored only when multiple upstream controllers are provided for the same hub 3. The downstream channel table stores the correspondence between the MAC addresses of the downstream controllers 12 to which the downstream channels are assigned, and the terminal addresses of the terminal devices to which the channels are assigned. The CPU 174 executes a predetermined processing according to the programs stored in the ROM (not shown), the detail of which will be described later.

Figure 9:
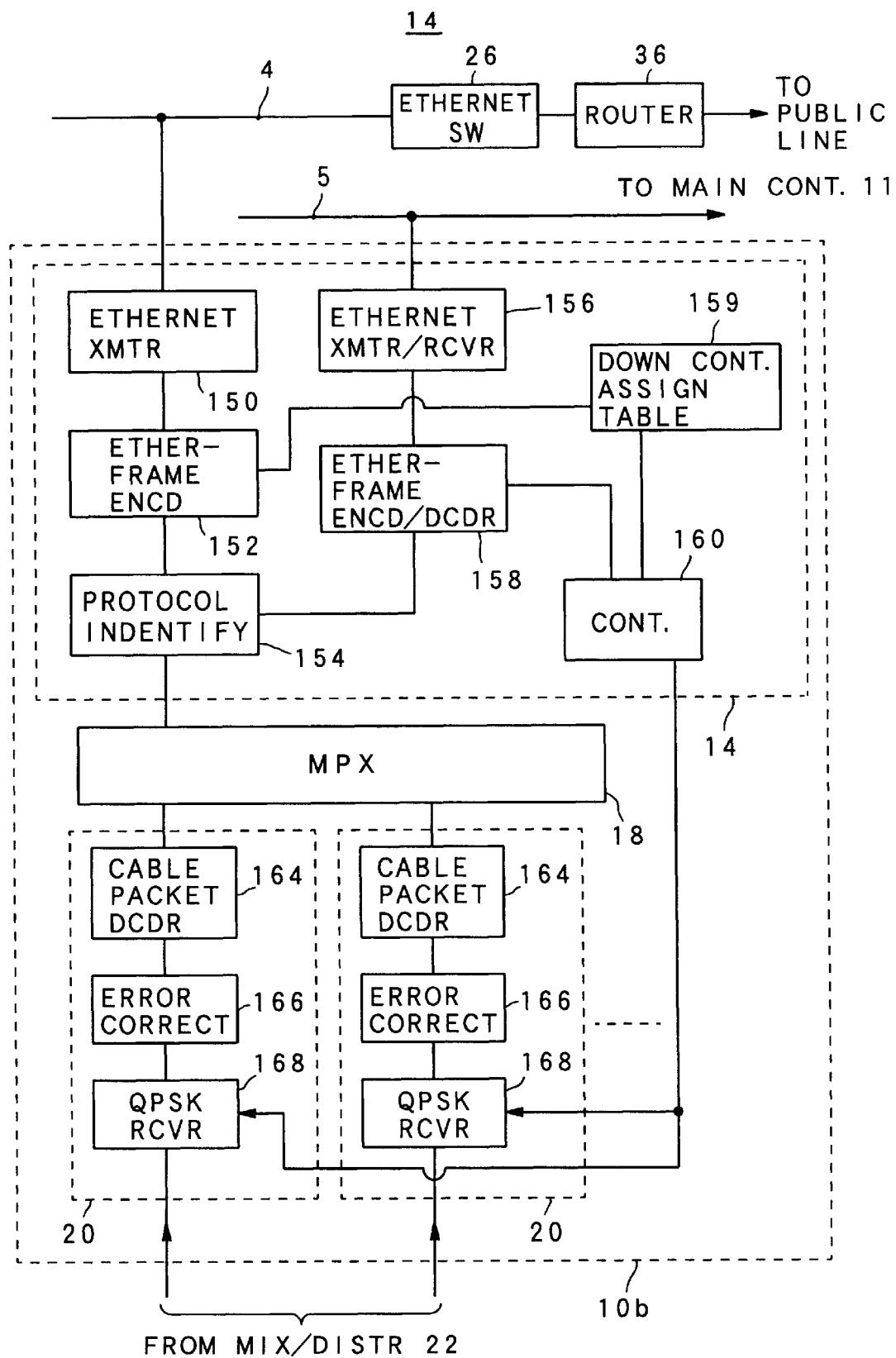
FIG. 9 is a block diagram showing the configuration of the upstream controller shown in FIG. 1.

Next, the configuration of the upstream controller 14 will be described. FIG. 9 shows the configuration of the upstream controller 14. The upstream controller 14 is connected via: the multiple demodulators of the number corresponding to the number of the upstream channels (30 in this embodiment) and the multiplexers 18. Each demodulator 20 includes the QPSK receiver 168 for receiving the QPSK signal, the error correction circuit 166 and the cable packet decoder 164 for detecting the cable packets. The multiplexer 18 time-divisionally multiplexes the data occasionally supplied from the plural demodulators 20 to enable the series processing thereof. In the upstream controller 14, the protocol identification circuit 154 refers to the protocol number 186 in the cable packet, and supplies the cable packets including the IP frames to the ether-frame encoder 152 and supplies the cable packets including the control frames to the ether-frame encoder/decoder 158. The ether-frame encoder 152 produces ethernet frames including IP frames, and the ethernet transmitter 150 transmits the ethernet frame thus produced to the center LAN 4. The ether-frame encoder/decoder 158 produces ethernet frames including control frames, and the ethernet transmitter/receiver 156 transmits the ethernet frames thus produced to the control LAN 5. The ethernet transmitter/receiver 156 also receives ethernet frames, and the ether-frame encoder/ decoder 158 also decodes the ethernet frames. The downstream controller assign table 159 stores, as shown in FIG. 10, the correspondence between the IP addresses of the IP data frames sent from the terminal devices 50, i.e., IP addresses of the sender personal computers 54, and the downstream controller numbers (shown by the channel numbers) and MAC addresses corresponding to the IP addresses. The controller 160 carries out various controls on the basis of the contents of the downstream controller; assign table 159 and the data transmitted and/or received, the detail of which will be described later.

Figure 11:
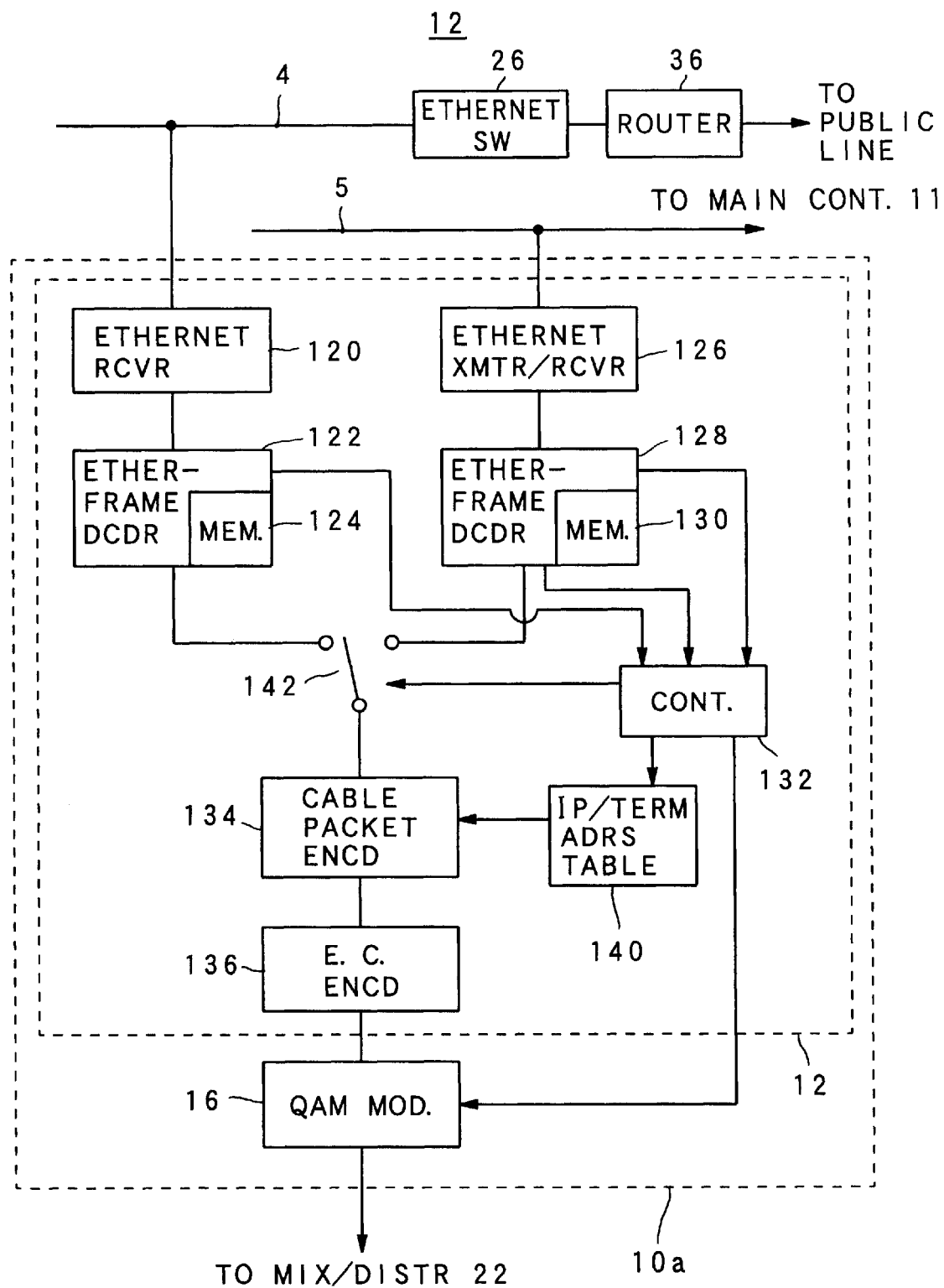
FIG. 11 is a block diagram showing the configuration of the downstream controller shown in FIG. 1.

Next, the configuration of the downstream controller will be described. FIG. 11 shows the configuration of the downstream controller 12, which includes the ethernet receiver 120 for receiving the ethernet frames from the center LAN 4 and the ether-frame decoder 122 for detecting the ethernet frames from the received signal. Further, the downstream controller 12 includes the ethernet receiver 126 for receiving the ethernet frames from the control LAN 5 and the ether-frame decoder 128 for detecting the ethernet frames from the received signal. The ether-frame decoders 122 and 128 include the internal memories 124 and 130, respectively. The switch 142 selectively supplies one of the outputs from the ether-frame decoders 122 and 128 to the cable packet encoder 134. The cable packet encoder 134 produces the cable packets, and the error correction encoder 136 adds the check bits 194 to the cable packets. The QAM modulator 16 modulates the cable packets by 64 QAM and supplies the results to the mixer/distributor 22. The IP-terminal address table 140 stores the correspondence between the IP addresses of the personal computers 54 and the terminal addresses of the terminal devices 50 to which the personal computers are connected. The controller 132 carries out various controls on the basis of the contents of the IP-terminal address table 140 and the data transmitted and/or received, the detail of which will be described later.

Next, the description will be given of the operation of the CATV communication system 1 as the terminal side processing mainly executed by the terminal device 50 and the center side processing mainly executed by the center device 10. First, the terminal side processing will be described.

[A] Terminal Side Processing

Figure 5:
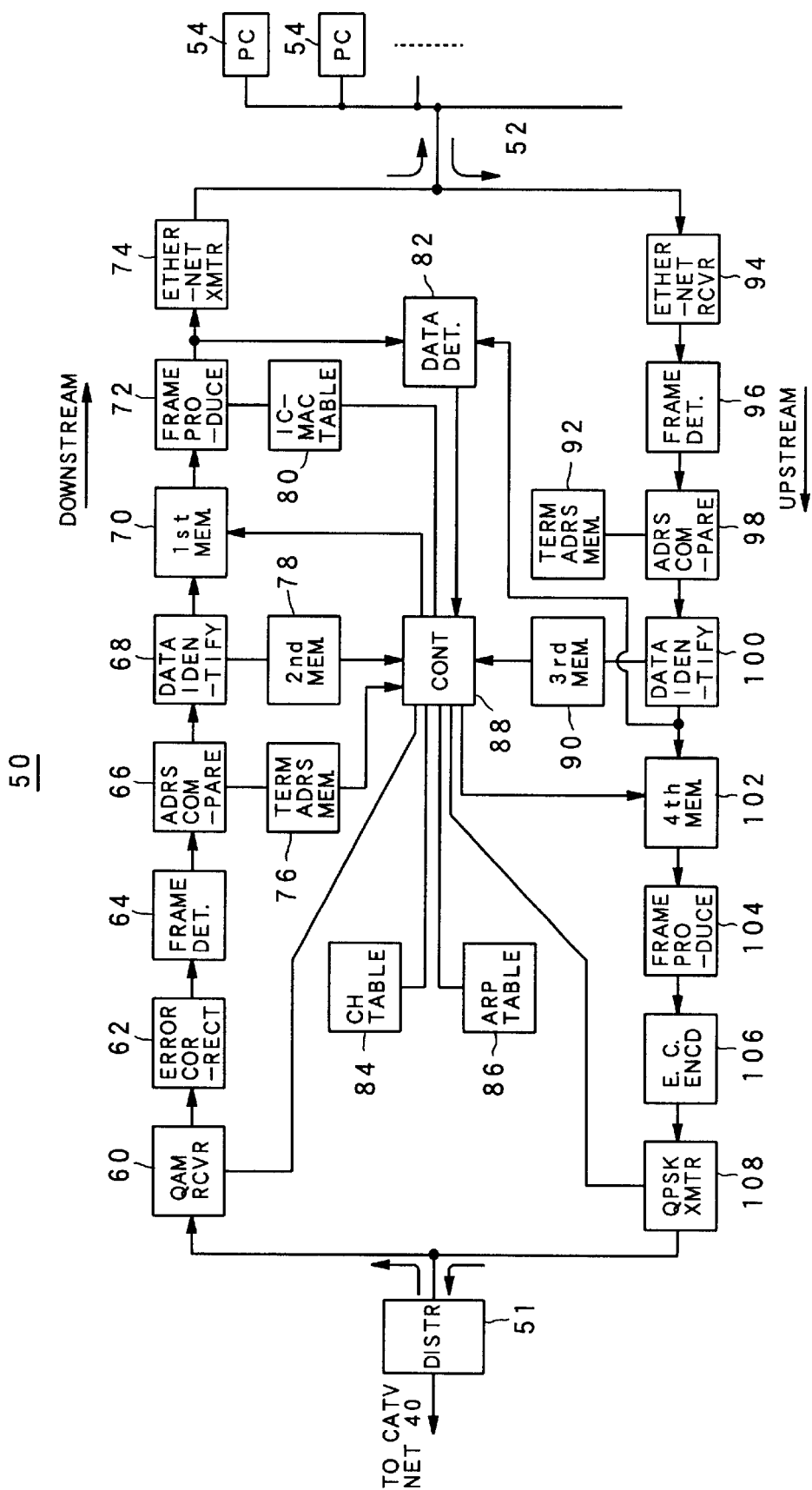
FIG. 5 is a block diagram showing the configuration of the terminal device shown in FIG. 1.

The terminal side processing is classified into (1) initial setting, (2) ARP processing, (3) line connection: processing, (4) downstream communication, (5) upstream communication and (6) line disconnection processing. These processing will be described below with reference to FIG. 1 and 5.

(1) Initial Setting:

The initial setting is executed at the time of power-on of the terminal device 50 to determine and store the upstream and downstream channels used for the data transmission between the terminal device 50 and the center 2.

First, when the terminal device 50 is powered, the controller 88 refers to the first channel of the multiple downstream channels preset and stored in the channel table 88, and tunes the QAM receiver 60 to that channel. It is noted that the channel information in the channel table 84 is determined in advance at the time of factory shipment. Then, the terminal device 50 receives the channel use information periodically transmitted from the center device 10. If the channel use information is receivable, it is recognized that the channel is available for communication use. Since the channel use information is transmitted every 0.5 seconds, it is possible to rapidly confirm whether the channel is for the communication use or not. Thereafter, the channel use information is received by the channel thus determined, and the terminal device 50 receives the physical channel information transmitted from the center 2 every 5 seconds if the QAM signal is being transmitted. The physical channel information includes the number of the channels usable as the upstream and downstream channels and their frequencies, and the physical channel information of identical contents is transmitted via all downstream channel for the communication use. Therefore, the physical channel information can be rapidly obtained by detecting one of the downstream channels for communication use. Since the cable packet including the physical channel information is applied with the global address, the cable packet is supplied to the data identification circuit 68 via the address comparison circuit 66, and then stored in the second memory 78. The controller 88 reads out the physical channel information from the second memory 78, and renews the contents of the channel table 84.

On the other hand, if channel use information, i.e., QAM signal is not obtained at the tuned channel for more than 0.5 seconds, the controller 88 judges that the channel is not for communication use, and repeats the same processing by tuning the QAM receiver 60 to next channel until the physical channel information is obtained. In this way, the number and frequencies of the upstream and downstream channels used for the data communication are determined and are stored in the channel table 84. Thereafter, the data communication is executed by using one of those channels.

(2) ARP Processing:

The ARP processing is a protocol for associating the IP address with the MAC address of ethernet, by which the MAC addresses of the terminal device 50 and the personal computer 54 in the terminal LAN 52 are notified to each other so as to enable the communication within the terminal LAN 52.

First, the personal computer 54 outputs the ARP data including its own MAC address to the terminal LAN 52 to know the MAC address of the terminal device 50 within the terminal LAN 52. Since the ARP data is broadcast data, it is received by the ethernet receiver 94 and is then supplied to the data identification circuit 100 via the frame detection circuit 96 and the address comparison circuit 98. Since the ARP data is control data, the data identification circuit 100 writes it into the third memory 90. Subsequently, the controller 88 reads out. the ARP data from the third memory 90, and judges, by referring to the ARP table 86, whether or not the IP address sent belongs to the terminal LAN; 52 to which the terminal device itself is connected. The ARP table stores IP addresses of the devices belonging to the terminal LAN 52 to which the subject terminal device 50 is connected. If the IP address transmitted exists in the ARP table, the controller 88 judges that the IP address is directed to other personal computer 54 connected to the terminal LAN 52 and does nothing. On the other hand, the IP address transmitted does not exist in the ARP table, the controller 88 judges that the data is directed to other terminal device 50 connected to the CATV net 40 or to the center device 10, and the terminal device 50 writes its own MAC address into the first memory 70. The frame production circuit 72 produces ethernet frame including the MAC address stored in the first memory 70, and sends it to the sender personal computer 54. By this, the sender personal computer 54 can know the MAC address of the terminal device 50 within the terminal LAN 52 and performs data communication thereafter using the MAC address thus obtained.

Figure 12:
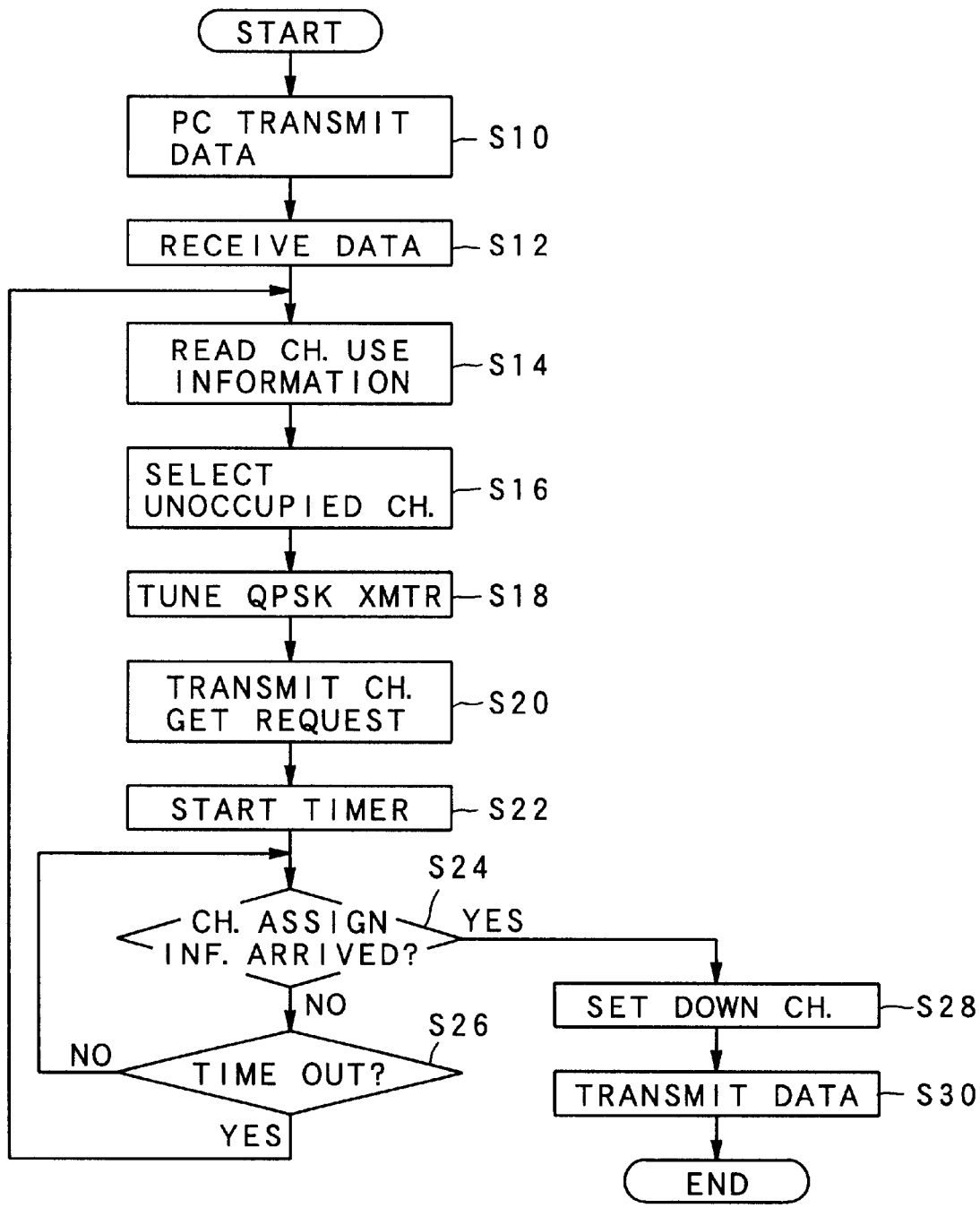
FIG. 12 is a flowchart showing the line connection processing.

(3) Line Connection Processing:

The line connection processing is to connect the personal computer 54 to the internet via the terminal device 50, the CATV net 40 and the center 2. This will be described with reference to FIGS. 5 and 12.

First, the personal computer 54 sends data to the terminal LAN 52 (step S10), and the ethernet receiver 94 receives the transmitted data (step S12). Then, the address comparison circuit 98 checks the receiver address in the transmitted data, and supplies the data to the data identification circuit 100 if the receiver address designates the terminal address of the subject terminal device 50. Here, if the transmitted data is IP data frame, the data identification circuit 100 stores the data into the fourth memory 102. Thereafter, in general, the frame production circuit 104 produces the cable packet to be transmitted to the CATV net 40, however, at this time it is not possible to transmit the cable packet immediately because the line connection is not established yet. Therefore, the IP data frame to be transmitted is maintained in the fourth memory 102 until the line connection is established.

Subsequently, the terminal device 50 tries to acquire the channel to be used for the connection to the center 2. The center 2 always knows unoccupied upstream channels from the terminal device 50 to the center 2, and this information is transmitted as the channel use information at every predetermined time period, e.g., 0.5 seconds,: from the center 2 to each terminal device 50. Since the channel use information is control frame, it is received by the QAM receiver 60 and then is stored in the second memory 78. Namely, the second memory 78 always stores latest channel use information. The controller 88 reads out the channel use information from the second memory 78 (step S14), and selects one of the unoccupied upstream channel (step S16). Here, the controller 88 uses random number to perform this selection because the use of the random number may avoid unevenness or deviation of the channel selection.

Subsequently, the controller 88 tunes the QPSK transmitter 108 to the channel thus determined (step S18). At this time, the controller 88 determines the power of the QPSK modulated signal by using the random number. In the QPSK modulation, if the receiver receives multiple carriers of the same frequency having a larger signal. power difference therebetween than a predetermined level, its PLL circuit becomes locked to the carrier of larger signal power to receive the signal of larger power. Therefore, if the power of the modulated signal is determined by the random number, the receiver receives the QPSK modulated signal of largest power even if multiple terminal devices 50 transmit carriers of the same frequency at the same time. If the difference is not introduced between the powers of the signals, all of the multiple signals simultaneously received are not appropriately accepted (treated invalid), and the senders have to repeat the transmission again. In order to avoid such vain transmissions, the power difference is introduced to the modulated signals by using the random number.

Subsequently, the controller 88 writes the channel get request into the fourth memory 102. At this time, the controller 88 delays the timing of writing the channel get request for a time period determined by a random number from the time of receiving the channel use information, so that the competition or collision of channel get requests can be avoided. Namely, even if plural terminal devices 50 select the same unoccupied channel at the same time, by delaying the transmission time of the channel get requests in the above manner, only the request most precedently reached to the center 2 is accepted. The channel use information sent from the center 2 arrives at all terminal devices 50 almost simultaneously. Therefore, by deliberately introducing the time difference to the transmission time of the channel get requests, only the most precedent request is received and treated validly even if plural terminal devices 50 select the same unoccupied channel accidentally, thereby avoiding invalidation of all competing requests and enabling efficient operation.

Subsequently, the frame production circuit 104 produces the cable packet including the channel get request as its contents and adds the error code. The cable packet thus produced is transmitted to the center 2 by the QPSK transmitter 108 (step S20). Simultaneously with this transmission, the controller 88 starts time counting using an internal timer (not shown) (step S22). The center 2, which received the cable packet including the channel get request, confirms the channel use information, determines to assign the channel to the terminal device 50 which issued the request most precedently, and sends the channel assign information notifying the assignment of the channel to the subject terminal device 50 via the downstream line. Here, since the channel get request from the controller 88 is sent after the competition avoiding processing in the terminal device 50, using the random number for the selection of the channel, determination of the signal power and the transmission time, the competition and the invalidation of the requests sent from multiple terminal devices may by avoided, thereby enabling rapid and efficient channel assignment.

After sending the channel get request, the controller 88 waits for the arrival of the channel assign information from the center 2 while continuing the time counting (steps S24, S26). If the channel assign information does not arrive within a predetermined time period, the controller 88 judges that the channel get request previously sent is not accepted, and returns to step S14 to repeat the processing from the selection of the unoccupied channel. On the contrary, if the channel assign information arrived from the center 2 within the predetermined time period, the controller 88 tunes the QAM modulator 60 to the downstream channel thus assigned (step S28). Since the line connection is established in this way, the frame production circuit 104 produces the cable packet including the IP data frame stored in the fourth memory 102, and the QPSK transmitter 108 transmits the cable packet to the center 2 via the CATV net 40 after addition of the error correction code by the error correction encoder 106 (step S30). In this manner, the channel for use in the communication is determined from the unoccupied channels, and the line connection is established to enable the data transmission to the center 2.

(4) Downstream Communication:

The downstream communication is to receive data from the servers on the internet or the server of the center 2 via the CATV net 40, after the personal computer 54 in the household is connected to the internet.

First, the QAM receiver 60 receives the QAM modulated signal transmitted via the CATV net 40 from the distributor 51, and outputs the demodulated data. The error correction circuit 62 performs the error correction according to the QAM modulation, and the frame detection circuit 64 detects the frame from the error-corrected data to obtain the cable packet. The address comparison circuit 66 refers to the receiver address 182 in the cable packet thus obtained, and judges whether or not the receiver address 182 is the address designating one of the terminal address of the terminal device 50 itself and the global address. If the receiver address 182 is one of them, the data identification circuit 68 refers to the contents code 186 in the cable packet, and judges whether or not the contents is IP data frame. If it is IP data frame, the controller 88 writes the contents data 190 into the first memory 78. If it is the control frame, the controller 88 writes the contents data 190 into the second memory 78. Since the control frame includes information relating to the communication control of the terminal device 50 and is not needed to be sent to the personal computers 54, it is stored in the second memory 78. The control in that case is described in the line connection processing described above or the line disconnection processing described later.

In a normal condition of downstream communication, since the contents data in the cable packet are all IP data packet, the data identification circuit 68 stores the contents data 190 into the first memory 70. Then, the frame production circuit 72 produces the ethernet frame from the IP data frame stored in the first memory 70. Concretely, the frame production circuit 72 obtains the receiver address 202 of the ethernet frame. This is because, the receiver address 182 of the cable packet is the terminal address, and hence it cannot be used as the receiver address 202 of the terminal LAN 52. The IP data frame stored in the first memory 70 includes the IP address which is an address on the internet. Although the IP address is owned by the user of the each personal computer, it is not possible to access each personal computer by using the IP address on the terminal LAN 52, and hence it is necessary to convert the IP address to the MAC address, which is the address effective on the ethernet. The frame production circuit 72 carries out this job. The correspondence between the IP address included in the transmitted IP data frame and the MAC address within the terminal LAN 52 is stored in the IP-MAC table 80. The contents of the IP-MAC table 80 can be rewritten by the instruction from the controller 88. Therefore, the frame production circuit 72 refers to the IP-MAC table 80 to obtain the MAC address corresponding to the IP address, and produces ethernet frame including the MAC address as the receiver address 202. At this time, the sender address 204 is the MAC address of the terminal device 50, and the contents of the IP data frame stored in the first memory 70 is included as the contents data 208.

When the ethernet frame is produced in this way, the ethernet transmitter 74 outputs the ethernet frame thus produced to the terminal LAN 52. The ethernet frame transmitted includes the receiver address 202 designating a specific personal computer 54, and hence the personal computer 54 corresponding to that address receives the ethernet frame and reads out the IP data frame to obtain the data sent from the server. In this way, data is transmitted from the server on the internet via the CATV net 40 to the personal computer 54 connected to the terminal device 50.

(5) Upstream Communication:

The upstream communication is to transmit data from the personal computer 54 to the server on the internet or the server of the center 2 via the CATV net 40, after the personal computer 54 in the household is connected to the internet.

First, the ethernet receiver 94 receives data sent from the terminal LAN 52, and the frame detection circuit 96 detects the ethernet frame from the received data. Then, the address comparison circuit 98 judges whether or not the receiver address 202 in the ethernet frame designates one of its own terminal address and the global address, and supplies the ethernet frame to the data identification circuit 100 if the receiver address 202 is one of them. Then, the data identification circuit 100 refers to the protocol number 206 of the internet frame thus received, and judges whether the contents data 208 is IP data frame or the control frame. If it is the IP data frame, the data identification circuit 100 writes the contents data 208 into the fourth memory 102. On the other hand, if it is the control frame, it is stored in the third memory 90 because the control information relates to the communication control of the terminal device 50 and it is not necessary to send it to the center 2. The control performed at that time is described in the above line connection processing or will be described later in the line disconnection processing.

Since the contents data 208 in the upstream communication is IP data frame, the frame production circuit 104 produces the cable packet in which the IP data frame stored in the fourth frame 102 is included as the contents data 190. At that time, the sender address 184 is the terminal address of its own, and the receiver address 182 is the address of the center 2. The error correction encoder 106 adds the check bit 194 to the cable packet thus produced, and the QPSK transmitter 108 modulates the cable packet with the check bit 194 by QPSK and transmits it to the CATV net 40 via the distributor 51. In this way, the cable packet sent to the CATV net 40 is received by the center 2.

(6) Line Disconnection Processing:

The line disconnection processing is that the terminal device 50 watches the upstream and downstream data communication condition, and forcibly terminates the transmission line (channel) by which the actual data transmission is not executed for more than a predetermined time period. The reason to perform the forcible termination is as follows. Namely, in the CATV system there is a limitation on the data transmission capacity, especially in the number of the upstream channels, as described above. Therefore, the transmission line which is unused for a long period of time should be forcibly terminated to enable other users to use that transmission line, so that as many users can make the connection as possible. The line disconnection processing will be described below with reference to FIGS. 5 and 13.

First, while the line connection is maintained, the data detection circuit 82 watches the presence or absence of the upstream and downstream data flow, and, if no data is actually transmitted in both directions for a predetermined time period, 5 seconds for example, informs of the absence of the actual data transmission to the controller 88 (step S32). Here, the watching time period, 5 seconds, is determined in the following reason. As a result of the simulation performed on the basis of the investigation result of the upstream/downstream data transmission occurrence frequency on the internet, if the watching time period is longer than 5 seconds, the loss probability inappropriately increase while if the watching time period is shorter than 5 seconds, the load required for the re-connecting processing inappropriately increases. For this reason, the watching time period in this embodiment is set to 5 seconds. However, of course, the watching period may be determined in accordance with the practical condition of the system.

The controller 88 receives the information from the data detection circuit 82, and writes the channel open request into the fourth memory 102. The frame production circuit 104 produces the cable packet including the channel open request, and the QPSK transmitter 108 sends it to the center 2 (step S34). Simultaneously, the controller 88 start counting time by the internal timer (step S36), and further stops the upstream transmission of other data after that.

On receiving the channel open request from the terminal device 50, the center 2 sends the channel open confirm information to the sender terminal device 50 as the downstream data, and simultaneously starts time counting by the internal timer. When the QAM receiver 60 in the terminal device 50 receives the channel open confirm information, the data identification circuit 68 writes the channel open confirm information into the second memory 78. The controller 88 reads the channel open confirm information in the second memory 78, and ends the line disconnection operation at the terminal side. It is noted that, in the downstream channel, the data reception is continued by the same channel so as to respond to the data transmission from the center side. On the other hand, if the channel open confirm information does not arrive from the center 2 within a predetermined time period from the issue of the channel open request by the terminal device 50 (step S40:No), the controller 88 judges that the channel open request is not accepted, and returns to the step S34 to repeat the operation from the transmission of the channel open request.

As described above, the center 2 starts counting time from the transmission of the channel open confirm information (step S34), and watches whether or not the same channel open request is sent again within a predetermined time period. Since the controller 88 in the terminal device is designed to send the same channel open request again (step S34) unless the channel open confirm information is arrived from the center 2, the center 2 judges that the terminal device 50 safely received and accepted the channel open confirm information if it does not receive the same channel open request again. Therefore, after confirming the absence of the transmission of the same channel open request within the predetermined time period, the center 2 completely disconnect the subject transmission line. By the above operation, the line disconnection is completed. The operation at the center 2 side will be described later in more detail.

In step S32, the data detection circuit 82 in the terminal device 50 judges that the data transmission is not going on if there is no downstream data transmission from the internet servers to the personal computers 54 and upstream data transmission from the personal computer 54 to the servers. For instance, when the user of the personal computer 54 inputs a URL (Uniform Resource Locator) or makes a click at the selective portion on the screen in order to access the WWW server 30, data designating the receiver is sent by the upstream line. Contrary, when the server sends image data or the like to the user, the data is transmitted by the downstream line. In this view, if the user of the personal computer does not make any access to the internet for the predetermined time period after the downstream data transmission from the server ends, the line is forcibly disconnected. Since the internet connection method utilizing the CATV net has a limitation on the numbers of the upstream and downstream channels, the line becomes occupied easily and immediately if a user exclusively uses one channel for a long time, like the case of using the telephone line. In this view, in the this embodiment, the channels, which are not used for more than a predetermined time period, are forcibly disconnected to improve the efficiency in use of the channels. Therefore, the user of the personal computer which channel is forcibly disconnected has to again start from the line connection processing to establish the connection, however, the reconnection can be relatively easily obtained because all channels are subject to the above described forcible disconnection processing by the terminal devices 50.

Figure 14:
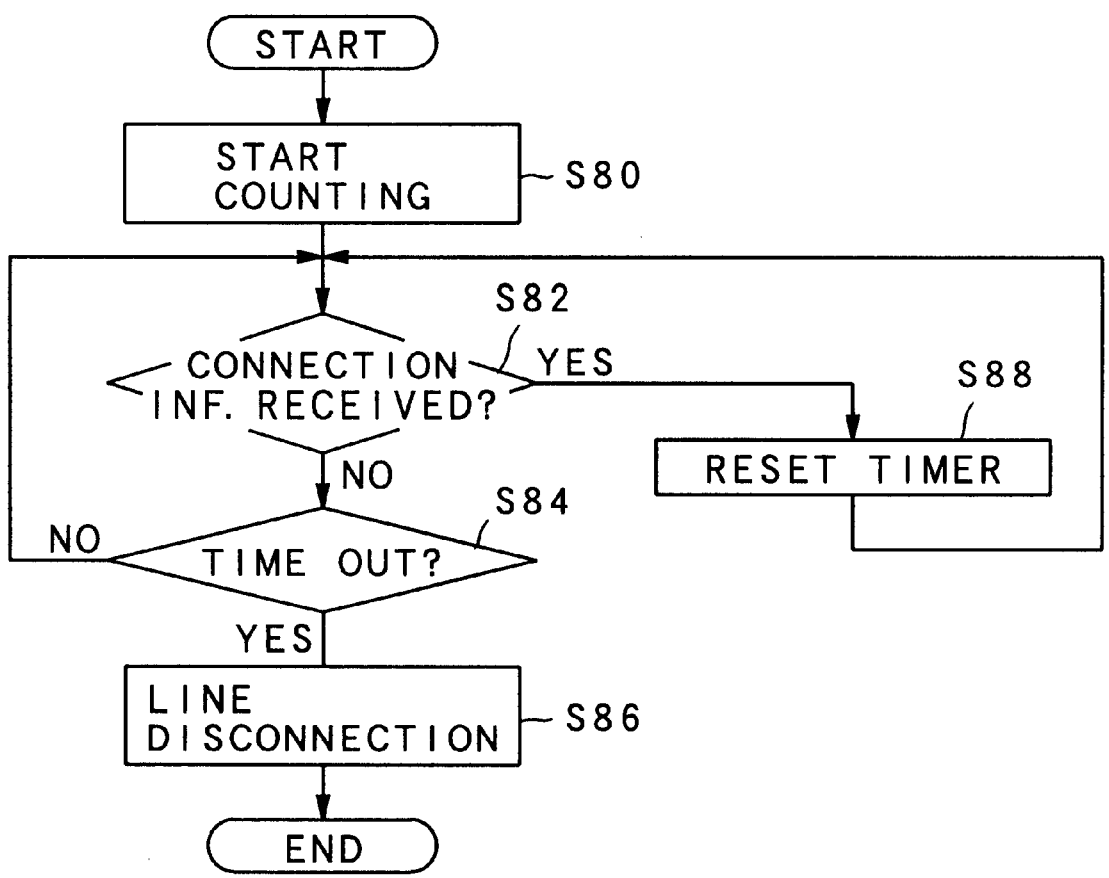
FIG. 14 is a flowchart showing an alternative method of the line disconnection processing.
Figure 15:
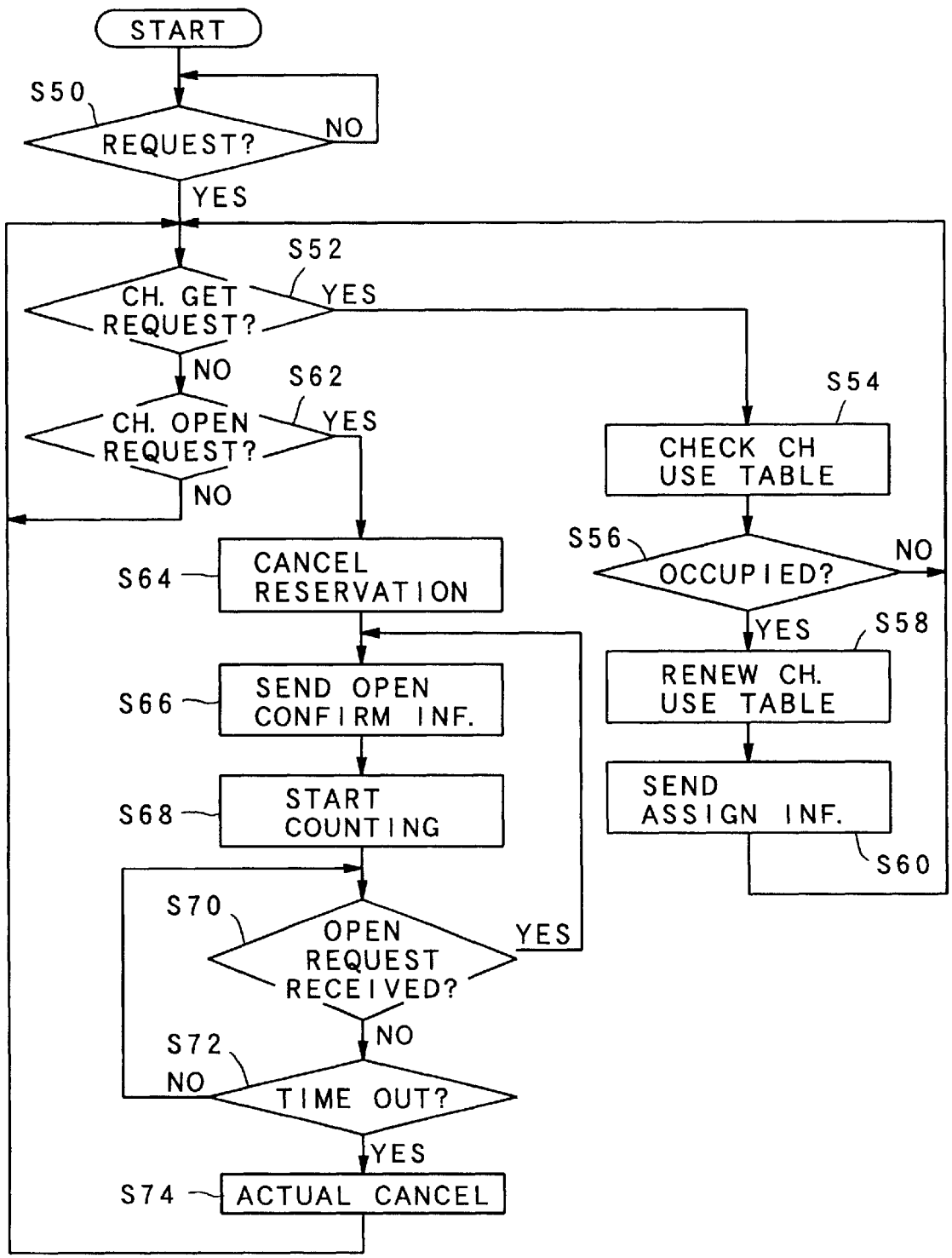
FIG. 15 is a flowchart showing the channel assign processing and the channel open processing executed by the main controller.

Next, an alternative method of the line disconnection processing will be described with reference to FIG. 14. In the above described method, the terminal device fills a role of detecting the presence or absence of the data transmission between the center 2 and the terminal device 50. In contrast, in this alternative method, the center 2 fills the role of detecting the absence of the data transmission.

In this method, the terminal device 50 sends the connection information to the center 2 at every predetermined time period (e.g., 5 seconds) during the data communication with the center 2 (see. FIG. 4). The main controller 11 in the center 2 watches the connection information. Concretely, when the line connection with. the terminal device 50 is established, the main controller 11 starts counting time by the internal timer (step S80), and waits for the arrival of the connection information from the terminal device 50. When receiving the connection information, the main controller 11 judges that the data transmission with the terminal device 50 is being normally carried out, and resets the timer (step S88) to repeat the same process. On the other hand, if the connection information does not arrive for more than a predetermined time period, the main controller 11 judges that the data transmission is not being normally carried out, and clears the channel use table 178 to forcibly disconnect the channel (step S86). It is noted that the main controller 11 sets the counting time of the timer to the time period more than some multiple of the time period (5 seconds in the above example) in which the line connection information is sent in the normal communication condition. For instance, when the time period set to the timer is 11 seconds, the line is forcibly disconnected if the connection information is not received successively twice, thereby avoiding the erroneous forcible disconnection in a case that the connection information is not received accidentally due to noise or other reasons. It is noted that the main controller 11 carries out the above processing to all terminal devices 50.

As described above, by employing the configuration to detect the presence or absence of the data transmission by the center 2, the forcible line disconnection can be surely achieved in such cases that the terminal device 50 is unable to send the connection information due to an accident such as a sudden blackout (power interruption) at the terminal side or disconnection of the transmission cable. Therefore, it is possible to avoid maintaining the channel connection vainly without actual data transmission, thereby achieving a total improvement of the transmission efficiency. It is noted that, since this line disconnection method has a compatibility with the aforementioned method of detecting the transmission absence by the terminal device side, not only either of them but both of them may be employed at the same time.

Although the exclusive protocol, i.e., connection information indicative of the line connected condition, is introduced in the above method, the protocol of the channel get request, for example, may be alternatively used such that the channel get request with respect to the channel, which has already been assigned to, is repeatedly sent to the center 2 at every predetermined time period after the connection is established. In this case, the center 2 judges that the line is normally in connection if the terminal device 50 already assigned with a channel is repeatedly sending the channel get requests for the same channel. In other words, the connection get request substitutes for the connection information after the establishment of the line connection, thereby avoiding the need to add new protocol.

Figure 13:
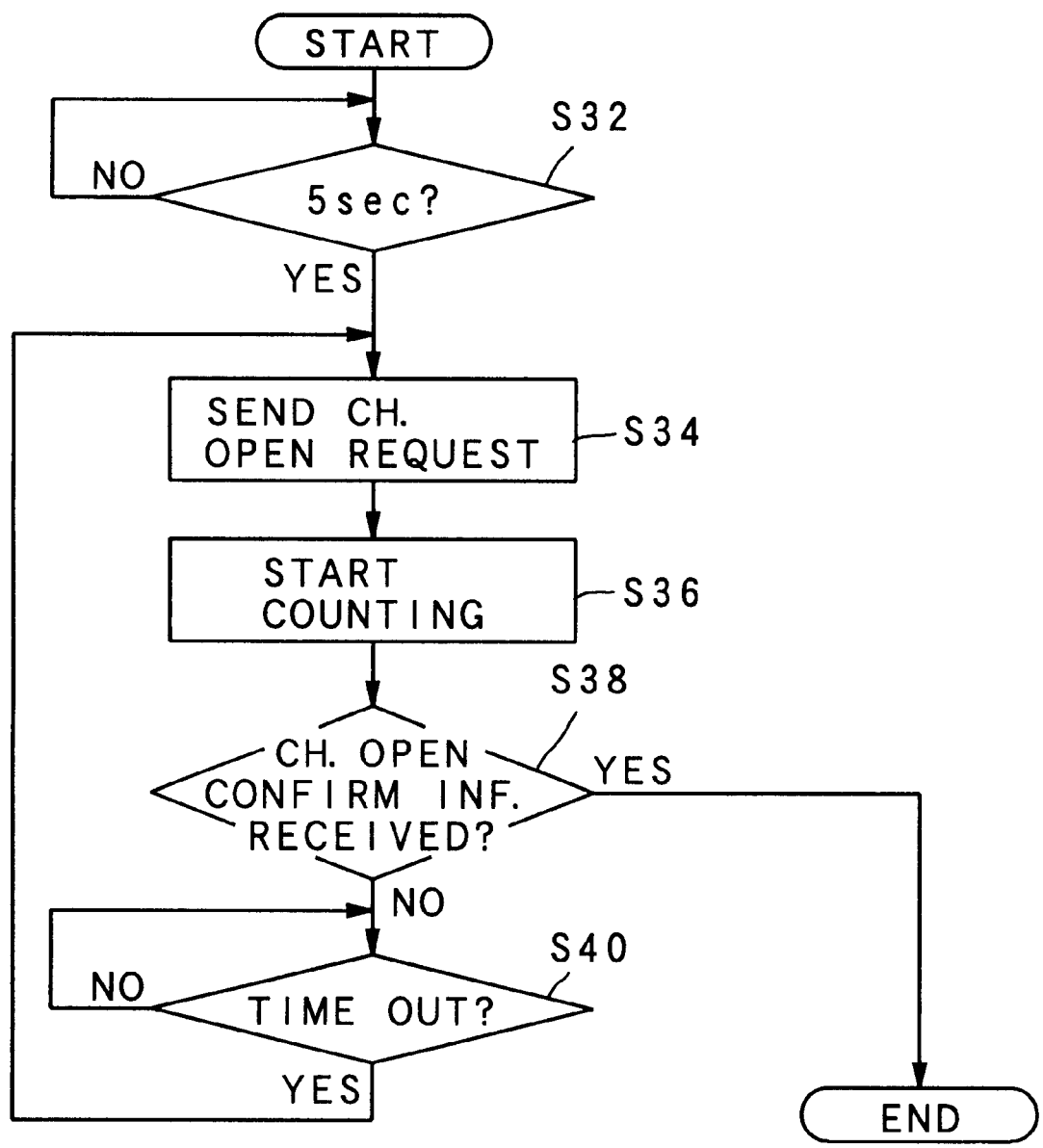
FIG. 13 is a flowchart showing the line disconnection processing.

Still further, as another alternative, the method similar to that shown in FIG. 13 may be carried out under the control of the center 2. Namely, the center 2 watches the absence of the data transmission, and sends the notification to disconnect the channel to the terminal device if the data transmission is not performed for a predetermined time period. The terminal device 50 receives the notification and returns the agreement information back to the center 2. The center 2 then forcibly disconnects the channel on receiving the agreement information. In other words, the center 2 send the notification corresponding to the channel open request, which is sent by the terminal device 50 in the method of FIG. 13, to the terminal device 50 via the downstream line at every predetermined time period, and the terminal device 50 sends the agreement information corresponding to the channel open confirm information, which is sent by the center in FIG. 13, to the center 2 via the upstream line. By this, the line connection and disconnection may be controlled by the center.

In the above method, the upstream and downstream data flow is watched to judge whether or not the data transmission is going on. However, in a downstream data distribution of broadcasting type, only the downstream data flows for a relatively long: time period after the initial upstream data flow. Namely, although the receiver of the data sends an ACK (Acknowledge) signal back to the sender at every predetermined amount of data transmission in normal bi-directional communication, such a signal is not sent in this type of communication. Therefore, if the upstream line is kept in connection because the downstream data flow is going on, the upstream line becomes occupied shortly. To avoid this, the system may be configured such that only the upstream data flow is watched and the upstream line is forcibly disconnected if the, upstream data flow pauses for more than a predetermined time period.

[B] Center Side Processing

Next, the control operation executed at the center device 10 will be described with reference to FIGS. 6 to 11 and 15. The center device 10 includes the upstream controller 14, the downstream controller 12 and main controller 11.

(1) Processing by Upstream Controller:

The upstream controller 14 executes two processing, i.e., the processing of the upstream data transmitted from the terminal device 50 via the CATV net 40, and the processing of the data transmitted from the main controller 11 via the control LAN 5. Those processing will be described with reference to FIGS. 9 and 10.

First, the description will be given of the processing of the upstream data transmitted from the terminal device 50. The cable packet transmitted from the terminal device 50 via the CATV net 40 is supplied to the demodulator 20 via the mixer/distributor 22. In the demodulator 20, the QPSK receiver 168 receives the cable packet. The cable packet thus received is subject to the error correction by the error correction circuit 166. Then, the cable packet decoder 164 detects the cable packet from the received data. This processing is carried out by multiple demodulators 20 in parallel processing, and the multiplexer 18 multiplexes these multiple upstream data. The protocol identification circuit 154 refers to the protocol number 186 in each cable packet in the multiplexed signal, and supplies the cable packet to the ether-frame encoder 152 if the protocol number 186 represents IP data frame. On the other hand, if the protocol number 186 represents the control frame, the protocol identification circuit 154 supplies the cable packet to the ether-frame encoder/decoder 158.

The ether-frame encoder 152 issues the ARP demand to the center LAN 4 to examine the receiver address of the IP data frame thus received, and receives the ARP response to obtain the MAC address, thereby the MAC address corresponding to the receiver server of the IP data frame is obtained. Subsequently, the ether-frame encoder 152 produces the ethernet frame to be sent to the receiver server via the center LAN 4 on the basis of the received cable packet. At that time, the sender address 204 of the ethernet frame is set to the MAC address of the downstream controller 12 which is to be set to the receiver of the response data from the server in connection. Namely, in order to send the response data, the receiver server sends the response data to the sender terminal device 50 via the downstream controller 12, and hence the sender address of the ethernet frame to be produced is set to the MAC address of the downstream controller 12 used in the downstream data transmission. If this processing is not carried out, the sender address 204 is set to the address of the upstream controller, and hence the response data from the receiver server to the sender terminal device 50 is sent to the upstream controller which has sent the ethernet frame. However, since the upstream controller is unable to execute downstream data transmission, the response data can not be sent to the terminal device. In order to overcome this problem, the ethernet frame encoder 152 sets the sender address 204 to the MAC address of the downstream controller 12 at the time of producing the ethernet frame.

Next, the description will be given of the manner to determine the downstream controller. FIG. 10 shows the contents of the downstream controller assign table 159 in which the correspondence of the receiver of the IP data frame to be transmitted via the terminal device 50, i.e., the IP address of the personal computer, and the upstream controller in charge of the personal computer is stored on the basis of the contents of the terminal-IP address table 176 and the channel use table 178. Since each downstream controller is applied with the MAC address on the center LAN 4, the ether-frame encoder 152 refers to the downstream controller assign table 159 to determine, from the IP address in the received cable packet, the MAC address of the downstream controller corresponding thereto. The ethernet transmitter 150 sends the ethernet frame thus produced to the center LAN 4. By the above processing, the IP data frame included in the cable packet sent by the terminal device 50 is transmitted to the receiver server.

On the other hand, if the protocol :identification circuit 154 detects the control frame, the ether-frame encoder/decoder 158 produces the ethernet frame in which the MAC address of the predetermined main controller 11 on the control LAN 5 is set to the receiver address 202, and the ethernet transmitter/receiver 156 sends it. By this, the control frame sent from the terminal device 50 is transmitted to the main controller 11.

Next, the processing of data transmitted: from the main controller 11 via the control LAN 5 will be described. When the main controller 11 sends the ethernet frame including the control frame, the ethernet transmitter/receiver 156 receives it, and supplies it to the ether-frame encoder/decoder 158. The ether-frame encoder/decoder 158 decodes the ethernet frame to obtain the control data therefrom. The control data thus obtained is supplied to the controller 160 which executes necessary processing, such as the renewal of the contents of the downstream controller assign table 159, according to the contents of the control data.

(2) Downstream Controller Processing:

The downstream controller 12 executes processing of the IP data received from the center LAN 4 and the control data received from the control LAN 5. This will be described with references to FIG. 11.

The ethernet frame sent from the center LAN 4 is received by the ethernet receiver 120, and the ether-frame decoder 122 decodes this to obtain the IP data frame. In addition, the ether-frame decoder 122 temporarily stores the IP data frame thus obtained into the memory 124, and notifies the controller 132 of the reception of the ethernet frame. On the other hand, the ethernet frame sent from the control LAN 5 is received by the ethernet receiver 126, and the ether-frame decoder 128 decodes it to obtain the control frame or the downstream controller control data. Further, the ether-frame decoder 128 notifies the controller 132 of the reception of the ethernet frame. Further, in the case of control frame, the ether-frame decoder 128 temporarily stores it in the memory 130 while in the case of downstream controller control data, the ether-frame decoder 128 supplies the contents thereof to the controller 132. On receiving the downstream controller control data, the controller 132 executes the content thereof. Concretely, the controller 132 carries out the renewal of the IP address-terminal address table 140, the channel selection of the QAM modulator 16 and the like.

On the other hand, when the IP data frame or the control frame is transmitted, the controller 132 turns over the switch 142 according to the reception notification of the ethernet frame from the ether-frame decoder 122 or 128. Then, the cable packet encoder 134 produces the cable packet on the basis of the ethernet frame. Here, if the ethernet frame is the IP data frame, the cable packet encoder 134 refers to the IP-terminal address table 140 to determine the receiver address 182. The IP-terminal address table 140 is produced on the basis of the data in the terminal-IP address table 176, and represents the correspondence between the terminal address and the IP address out of the contents shown in FIG. 7. It is noted that, if the ethernet frame is the control frame, this operation is not necessary because the terminal address has been determined in advance. When the cable packet is produced, the error correction encoder 136 adds the check bit 194 to the cable packet, and the cable packet is modulated by the QAM modulator 16 and then transmitted to the terminal device 50 via the mixer/distributor 22.

(3) Main Controller Processing:

The main controller administrates, the controls in the center device 10 between the upstream controller 14 and the downstream controller 12 connected to the control LAN 5. The operation of the main controller 11 is roughly classified into the channel use information processing, the channel assign processing and the channel open processing. These processing will be described with reference to FIGS. 6 to 8 and 15.

The channel use information processing is to examine the use condition of the multiple channels provided between the terminal device 50 and the center device 10 to produce the channel use information. First, the CPU 174 cyclically refers to the channel use table 174 with a predetermined time interval, according to the program prepared in advance, to generate channel use information. The contents of the channel use table is shown in FIGS. 8A and 8B. As shown, the channel use table 178 stores the use condition of the upstream and downstream lines, the terminal address or the MAC address and the upstream controller number. The upstream controller number is an identification number of the controller applied when plural upstream controllers are used to operate more than 30 upstream channels for a single hub. The CPU 174 refers to the use condition, and produces the channel use information indicating the unoccupied channel at that time. Then, the ethernet encoder/decoder 172 produces the ethernet frame including the channel use information thus produced. Here, the receiver address 202 is set to a certain address designating all downstream controllers. The ethernet transmitter/receiver 170 sends the ethernet frame thus produced to the control LAN 5. In response, the downstream controller 14 produces the cable packet including the channel use information, and sends them to each terminal device 50. By this, the channel use information is periodically sent to all terminal device 50.

Next, the channel assign processing will be described. The channel assign processing is to assign the channels in response to the channel get request transmitted from the terminal device 50.

The upstream controller periodically watches the channel get request from the terminal device 50 (step S50). When the terminal device 50 sends the channel get request, the upstream controller receives it (step S52), and produces the ethernet frame to send it to the control LAN 5. The ethernet transmitter/receiver 170 in the main controller 11 receives it, and the ethernet encoder/decoder 172 decodes it to read out the channel get request. Then, the CPU 174 refers to the channel use table 178 to check whether or not the channel designated by the channel get request is occupied (step S54). In FIG. 8A, the character "Y" represents the occupied status and the character "N" represents the unoccupied status. If it is unoccupied, the CPU 174 determines to permit the use of the channel, and change the status of the channel in the channel use table 178 to the occupied status (step S58). Simultaneously, the CPU 174 stores the address ("2" in the example of FIG. 8B) and the other information of the terminal device 50 to which the use of the channel is permitted. Then, the CPU 174 refers to the downstream channel table, selects the downstream channel so that the usage rate of the multiple downstream controllers becomes constant, and stores the address of the terminal device, which has sent the channel get request, for the selected channel.

Subsequently, the CPU 174 produces the upstream controller control data to renew the channel assign information and the contents of the downstream controller assign table 159 on the basis of the above information. Then, the ethernet encoder/decoder 172 produces two ethernet frames, one including the channel use information and directed to the upstream controller, the other including the upstream controller control data and directed to the upstream controller. If there are plural upstream controllers, ethernet frames directed to all upstream controllers are produced. Then, the ethernet transmitter/receiver 170 transmits the ethernet frames thus produced to the control LAN 5 (step S60). By this operation, the channel get processing is carried out.

Next, the channel open processing will be described. The channel open processing is to open the channel in use and send the channel open confirm information, in response to the channel open request sent from the terminal device 50.

The upstream controller 12 periodically watches the arrival of the channel open request (step S50), and on receiving it, the upstream controller 12 sends it to the main controller 11 via the control LAN 5. The ethernet transmitter/receiver 170 of the main controller 11 receives it. Then, the ethernet encoder/decoder 172 decodes the ethernet frame to read the channel open request (step S62). Then, the CPU 174 makes a cancel reservation in the terminal-IP address table 176 before actually disconnecting the channel to the terminal device 50 designated by the channel open request and delete the data on the channel use table 178 (step S64, see. FIG. 7, cancel reservation flag "R"). Then, the CPU 174 produces the channel open confirm information directed to the terminal device which has issued the request, and produces the upstream controller control data to delete the terminal device from the table 159. Then, the ethernet encoder/decoder 172 produces the ethernet frame including the channel open confirm information and directed to the downstream controller 14, and the ethernet transmitter/receiver 170 transmits it (step S66). Simultaneously, the main controller 11 starts counting time by the internal timer (step S68).

Unless receiving the same channel open request from the same terminal device within a predetermined time period from the start of the time counting, the CPU 174 actually deletes the channel previously reserved from the channel use table 178 (step S74). By this, the broken line portions in FIGS. 8A and 8B are deleted. Further, the cancel reservation flag in the terminal-IP address table 176 is deleted. Subsequently, the ethernet encoder/decoder 172 produces the ethernet frame including the upstream controller control information to renew the table 159 in the upstream controller 14 and directed to the upstream controller 14, and the ethernet transmitter/receiver 170 transmits it to the control LAN 5.

As described above, the channel is not opened (disconnected) immediately in response to the channel open request but the channel open reservation is made before the actual disconnection. This is due to the following reason. If the channel is actually disconnected immediately after the channel open request, other terminal device may start the use of the channel. However, the terminal device which has sent the channel open request does not know whether the channel is actually opened or not, and hence sends the same channel open request once again, which may collide with the data sent by the other terminal device which has started using the channel just after the disconnection thereof. In order to overcome this problem, the center makes the channel open reservation in response to the channel open request and sends the channel open confirm information back to the sender terminal device to judge whether or not the terminal has safely received the channel open confirm information. Then, the center ends the line disconnection processing if the same channel open request does not arrive in the predetermined time period. After this judgment, the center actually disconnects the line.

As described above, in the present invention, the center device is provided on the center side of the CATV system while the terminal device is provided on the terminal side, and the communication therebetween is established by using the cable packet. Therefore, the internet connection can be achieved with effectively utilizing the CATV net which has a limit on the number of channels provided.

In the above description, the use of the hybrid type CATV system, the LAN configuration at the terminal side and the establishment of the respective LAN by the ethernet are all mere examples of the invention and should not be understood to limit the scope of the present invention.

What is claimed is:

1. A CATV communication system comprising a center and a plurality of terminal devices connected via a CATV net, said center comprising:
    a first transmitter for transmitting, to said terminal device, upstream channel use information representing unoccupied channel out of a plurality of upstream channels;
    a first detector for detecting channel get request from data transmitted from said terminal device;
    a second detector for detecting a presence of the unoccupied channel in the upstream channels when the channel get request is detected;
    a second transmitter for assigning one of the detected unoccupied channels to the terminal device which has transmitted the channel get request and for transmitting channel assign data including a designation of the assigned channel to the terminal device when the unoccupied channel is detected; and
    a first communication unit for performing data communication with the terminal device via the assigned channel, and said terminal device comprising:
    a second communication unit connected to a computer for performing communication with the computer;
    a third detector for detecting center-directed data, to be transmitted to the center, which is included in the data received from the computer;
    a fourth detector for detecting the upstream channel use information from the data transmitted from said center when the center-directed data is detected;
    a third transmitter for selecting one of the unoccupied channels on the basis of the upstream channel use information and for transmitting the channel get request designating the selected channel to the center;
    a fifth detector for detecting the channel assign information from the data transmitted from said center; and
    a third communication unit for performing data communication with said center by using the upstream channel designated by the channel assign information for data transmission after the channel assign information is detected.

2. A system according to claim 1, wherein said terminal device comprises a unit for transmitting channel open request which requests a disconnection of the upstream channel used by the third communication unit when the third communication unit does; not perform at least upstream communication with said center for more than a predetermined time period, and said center comprises a unit for forcibly disconnecting the channel designated by the channel open request when receiving the channel open request.

3. A system according to claim 1, wherein said terminal device comprises a unit for transmitting channel open request which requests a disconnection of the upstream channel used by the third communication unit when the third communication unit does not perform at least upstream communication with said center for more than a predetermined time period, and said center comprises a unit for transmitting confirmation information to confirm the disconnection of the channel to said terminal device when receiving the channel open request, and a unit for forcibly disconnecting the channel designated by the channel open request unless receiving the same channel open request again within a predetermined time period from the transmission of the confirmation information.

4. A system according to claim 1, wherein said center comprises a center LAN (Local Area Network) connected to one or more servers and said CATV net, and a control LAN independent of the center LAN and comprising one or more upstream controllers each having a:given number of channels, a given number of downstream controllers and a main controller for controlling the upstream controller and the downstream controller.

5. A system according to claim 1, wherein said center comprises a unit for detecting whether or not a condition of the communication with said terminal device is normal, and a unit for forcibly disconnecting the channel assigned to the first communication unit if the condition is not normal.

6. A system according to claim 1, wherein said terminal device comprises a unit for transmitting connection information, indicating that the data communication is going on, to said center at every predetermined time period during the data communication with said center, and said center comprises a unit for forcibly disconnecting the channel assigned to the first communication unit if the connection information is not transmitted for more than a predetermined time period.

7. A system according to claim 1, wherein said terminal device comprises a unit for transmitting the channel get request to said center at every predetermined time period after the channel assignment by the second transmitter, and said center comprises a unit for forcibly disconnecting the channel assigned to the first communication unit if the channel get request is not transmitted for more than a predetermined time period.

8. A system according to claim 1, wherein said third transmitter selects the unoccupied channel using a random number.

9. A system according to claim 1, wherein said third transmitter transmits the channel get request as a signal having a signal power determined by a random number.

10. A system according to claim 1, wherein said third transmitter transmits the channel get request at transmission timings determined by a random number.

11. A system according to claim 1, wherein the first communication unit and the third communication unit perform the data communication between said center and said terminal device by using cable packets including control data associated with a control of the channel to be used or internet protocol frames.

12. A center connected to a plurality of terminal devices via a CATV net, comprising:
 a first transmitter for transmitting, to said terminal device, upstream channel use information representing unoccupied channel out of a plurality of upstream channels;
 a first detector for detecting channel get request, including a designation of a channel to be used, from data transmitted from said terminal device;
 a second detector for detecting a presence of the unoccupied channel in the upstream channels when the channel get request is detected;
 a second transmitter for assigning one of the detected unoccupied channels to the terminal device which has transmitted the channel get request and for transmitting channel assign data including a designation of the assigned channel to the terminal device when the unoccupied channel is detected;
 a first communication unit f or performing data communication with the terminal device by using the assigned channel for data transmission; and
 a unit for forcibly disconnecting the channel designated by a channel open request which requests a disconnection of the upstream channel used for the communication with said terminal device when receiving the channel open request.

13. A center according to claim 12, wherein the first communication unit performs the data communication with said terminal device by using cable packets including control data associated with a control of the channel to be used or internet protocol frames.

14. A center connected to a plurality, of terminal devices via a CATV net, comprising:
 a first transmitter for transmitting, to said terminal device, upstream channel use information representing unoccupied channel out of a plurality of upstream channels;
 a first detector for detecting channel get request, including a designation of a channel to be used, from data transmitted from said terminal device;
 a second detector for detecting a presence of the unoccupied channel in the upstream channels when the channel get request is detected;
 a second transmitter for assigning one of the detected unoccupied channels to the terminal device which has transmitted the channel get request and for transmitting channel assign data including a designation of the assigned channel to the terminal device when the unoccupied channel is detected;
 a first communication unit for performing data communication with the terminal device by using the assigned channel for data transmission;
 a unit for transmitting confirmation information to confirm the disconnection of the channel to said terminal device when receiving a channel open request which requests a disconnection of the upstream channel used for the data communication with said terminal device; and
 a unit for forcibly disconnecting the channel designated by the channel open request unless receiving the same channel open request again within a predetermined time period from the transmission of the confirmation information.

15. A center according to claim 14, wherein the first communication unit performs the data communication with said terminal device by using cable packets including control data associated with a control of the channel to be used or internet protocol frames.

16. A center connected to a plurality of terminal devices via a CATV net, comprising:
 a first transmitter for transmitting, to said terminal device, upstream channel use information representing unoccupied channel out of a plurality of upstream channels;
 a first detector for detecting channel get request, including a designation of a channel to be used, from data transmitted from said terminal device;
 a second detector for detecting a presence of the unoccupied channel in the upstream channels when the channel get request is detected;
 a second transmitter for assigning one of the detected unoccupied channels to the terminal device which has transmitted the channel get request and for transmitting channel assign data including a designation of the assigned channel to the terminal device when the unoccupied channel is detected;
 a first communication unit for performing data communication with the terminal device by using the assigned channel for data transmission;
 a unit for detecting whether or not a condition of the communication with said terminal device is normal; and
 a unit for forcibly disconnecting the channel assigned to the first communication unit if the condition is not normal.

17. A center according to claim 16, wherein the first communication unit performs the data communication with said terminal device by using cable packets including control data associated with a control of the channel to be used or internet protocol frames.

18. A center connected to a plurality of terminal devices via a CATV net, comprising:
 a first transmitter for transmitting, to said terminal device, upstream channel use information representing unoccupied channel out of a plurality of upstream channels;
 a first detector for detecting channel get request, including a designation of a channel to be used, from data transmitted from said terminal device;

a second detector for detecting a presence of the unoccupied channel in the upstream channels when the channel get request is detected;

a second transmitter for assigning one of the detected unoccupied channels to the terminal device which has transmitted the channel get request and for transmitting channel assign data including a designation of the assigned channel to the terminal device when the unoccupied channel is detected;

a first communication unit for performing data communication with the terminal device by using the assigned channel for data transmission; and a unit for forcibly disconnecting the channel assigned to the first communication unit if a connection information, indicating that the data communication is going on, is not transmitted from said terminal device for more than a predetermined time period.

19. A center according to claim 18, wherein the first communication unit performs the data communication with said terminal device by using cable packets including control data associated with a control of the channel to be used or internet protocol frames.

20. A terminal device connected to a center via a CATV net, comprising:

a first communication unit connected to a computer for performing communication with the computer;

a first detector for detecting center-directed data, to be transmitted to the center, which is included in the data received from the computer;

a second detector for detecting upstream channel use information representing an unoccupied channel out of a plurality of upstream channels from the data transmitted from said center when the center-directed data is detected;

a first transmitter for selecting one of the unoccupied channels on the basis of the upstream channel use information and for transmitting the channel get request designating the selected channel to the center;

a third detector for detecting channel assign information from the data transmitted from said center, said channel assign information being transmitted by said center in response to the channel get request and assigning an unoccupied channels; and a second communication unit for performing data communication with said center by using the upstream channel designated by the channel assign information for data transmission after the channel assign information is detected.

21. A terminal device according to claim 20, further comprising a unit for transmitting channel open request which requests a disconnection of the upstream channel used by the second communication unit when the second communication unit does not perform at least upstream communication with said center for more than a predetermined time period.

22. A terminal device according to claim 20, wherein said first transmitter selects the unoccupied channel using a random number.

23. A terminal device according to claim 20, wherein said first transmitter transmits the channel get request as a signal having a signal power determined by a random number.

24. A terminal device according to claim 20, wherein said first transmitter transmits the channel get request at transmission timings determined by a random number.

25. A terminal device according to claim 20, wherein the second communication unit performs the data communication with said center by using cable packets including control data associated with a control of the channel to be used or internet protocol frames.

26. A CATV communication method for performing a communication between a center and a plurality of terminal devices connected via a CATV net, said method comprising the steps of:

transmitting, from said center to said terminal device, upstream channel use information representing unoccupied channel out of a plurality of upstream channels at every predetermined time period;

detecting, in said terminal device, center-directed data, to be transmitted to said center, which is included in the data received from a computer to which the terminal device is connected;

detecting, in said terminal device, the upstream channel use information from the data transmitted from said center when the center-directed data is detected;

selecting, in said terminal device, one unoccupied channel on the basis of the upstream channel use information and transmitting the channel get request designating the selected channel to said center;

detecting, in said center, channel get request from data transmitted from said terminal device;

detecting, in said center, a presence of the unoccupied channel in the upstream channels when the channel get request is detected;

assigning, in said center, one of the detected unoccupied channels to the terminal device which has transmitted the channel get request and transmitting channel assign data including a designation of the assigned channel from the center to the terminal device when the unoccupied channel is detected;

detecting, in said terminal device, the channel assign information from the data transmitted from said center; and performing data communication between said center and said terminal device by using the upstream channel designated by the channel assign information for data transmission after the channel assign information is detected.

27. A CATV communication method for performing a communication between a center and a plurality of terminal devices connected via a CATV net, said method comprising the steps of:

transmitting upstream channel use information representing unoccupied channel out of upstream channels from said center to said plurality of terminal devices;

detecting the upstream channel use information if there is data to be transmitted to said center, and selecting on:e of the unoccupied channels and transmitting channel get request to said center if the upstream channel use information is detected;

checking a condition of occupancy of the requested upstream channel when receiving the channel get request in said center, assigning the channel to the terminal device which has transmitted the channel get request if the requested channel is unoccupied, and transmitting channel assign data including a designation of the assigned channel to the terminal device; and transmitting the data to said center via the assigned upstream channel when said terminal device which has transmitted the channel get request detects the channel assign information.

28. A method according to claim 27, further comprising the steps of:

transmitting, from said terminal device, channel open request which requests a disconnection of the assigned upstream channel when the upstream communication using the assigned channel is not performed for more than a predetermined time period; and forcibly disconnecting, in said center, the channel designated by the channel open request when receiving the channel open request.

29. A method according to claim 27, further comprising the steps of:

transmitting, from said terminal device, channel open request which requests a disconnection of the assigned upstream channel when the upstream communication using the assigned: channel is not performed for more than a predetermined time period;

transmitting channel open confirmation information to confirm the disconnection of the channel from said center to said terminal device which has transmitted the channel open request when receiving the channel open request; and forcibly disconnecting, in said center, the channel designated by the channel open request unless receiving the same channel open request again within a predetermined time period from the transmission of the channel open confirmation information.

30. A method according to claim 27, further comprising the steps of:

detecting, in said center, whether or not a condition of the communication with said terminal device is normal; and forcibly disconnecting the channel assigned to the terminal device if the condition is not normal.

31. A method according to claim 27, further comprising the steps of:

transmitting connection information, indicating that the data communication is going on, from said terminal device to said center at every predetermined time period during the data communication with said center; and forcibly disconnecting, in said center, the channel assigned to the terminal device if the connection information is not transmitted for more than a predetermined time period.

32. A method according to claim 27, further comprising the steps of:

transmitting the channel get request from said terminal device to said center at every predetermined time period after the upstream channel is assigned; and forcibly disconnecting, in said center, the channel assigned to said terminal device if the channel get request is not transmitted for more than a predetermined time period.

33. A method according to claim 27, further comprising the step of selecting, in said terminal device, the unoccupied channel using a random number.

34. A method according to claim 27, further comprising the step of transmitting the channel get request, from said terminal device, as a signal having a signal power determined by a random number.

35. A method according to claim 27, further comprising the step of transmitting, in said terminal device, the channel get request at transmission timings determined by a random number.

* * * * *